(12) United States Patent
Cox et al.

(10) Patent No.: US 12,645,940 B2
(45) Date of Patent: Jun. 2, 2026

(54) SYSTEMS AND METHODS FOR CHAINED MACHINE LEARNING MODELS FOR SIGNAL DATA SIGNATURE LABELLING

(71) Applicant: Covid Cough, Inc., Greenwood Village, CO (US)

(72) Inventors: Morgan Cox, Lakewood, CO (US); Nolan Donaldson, Englewood, CO (US); Mark Fogarty, Seneca, SC (US); Kristan S. Hopkins, North Andover, MA (US); John Kattirtzi, Greenwood Village, CO (US); Simon Kotchou, Phoenix, AZ (US); Julia Komissarchik, Draper, UT (US); Edward Komissarchik, Draper, UT (US); Robert F. Scordia, Ridgewood, NY (US); Adam Stogsdill, Cypress, TX (US)

(73) Assignee: Covid Cough, Inc., Greenwood Village, CO (US)

( * ) Notice: Subject to any disclaimer, the term of this patent is extended or adjusted under 35 U.S.C. 154(b) by 596 days.

(21) Appl. No.: 18/315,572

(22) Filed: May 11, 2023

(65) Prior Publication Data

US 2023/0368026 A1      Nov. 16, 2023

Related U.S. Application Data

(60) Provisional application No. 63/340,555, filed on May 11, 2022.

(51) Int. Cl.
G06N 3/08          (2023.01)
G06N 3/045          (2023.01)

(52) U.S. Cl.
CPC ............... G06N 3/08 (2013.01); G06N 3/045 (2023.01)

(58) Field of Classification Search
CPC .......... G06N 3/08; G06N 3/045; G06N 3/044; G06N 3/0464; G06N 3/0475; G06N 3/084; G06N 3/092; G06N 3/094; G06N 3/006
See application file for complete search history.

(56) References Cited

U.S. PATENT DOCUMENTS

| | | | |
|---|---|---|---|
| 5,199,077 | A | 3/1993 | Wilcox et al. |
| 5,660,176 | A | 8/1997 | Iliff |

(Continued)

FOREIGN PATENT DOCUMENTS

| | | |
|---|---|---|
| CA | 2810457 A1 | 3/2013 |
| CN | 108766419 B | 10/2020 |

(Continued)

OTHER PUBLICATIONS

International Search Report in International Application No. PCT/US2023/066864 mailed Sep. 13, 2023.

(Continued)

*Primary Examiner* — Ryan Barrett
(74) *Attorney, Agent, or Firm* — Greenberg Traurig, LLP; Kristopher Reichlen; David J. Dykeman

(57)          ABSTRACT

Systems and methods of the present disclosure enable identifying labelling a source signal data signature using a computing system to test candidate chain oracle models by iteratively performing, for each particular number of neural network models in the range of the number of neural network models, a predetermined number of trials, where each trail includes: randomly selecting the particular number of neural network models; utilizing each neural network model of the particular number of neural network models to generate a respective predictive output based on the second input data; utilizing the LR model to generate a trial output based on the respective predictive output, and determining a model trial performance based on: the trial output, the (Continued)

second output data, and at least one machine learning performance metric. A chain oracle model from the candidate chain oracle models is determined based on the machine learning performance metric.

20 Claims, 7 Drawing Sheets

(56) References Cited

U.S. PATENT DOCUMENTS

| | | | |
|---|---|---|---|
| 5,983,178 | A | 11/1999 | Naito |
| 6,436,057 | B1 | 8/2002 | Goldsmith |
| 6,963,835 | B2 | 11/2005 | Kimball |
| 7,267,652 | B2 | 9/2007 | Coyle |
| 7,386,453 | B2 | 6/2008 | Polanyi et al. |
| 8,442,821 | B1 | 5/2013 | Vanhoucke |
| 8,447,592 | B2 | 5/2013 | Edgington |
| 9,015,093 | B1 | 4/2015 | Commons |
| 9,020,816 | B2 | 4/2015 | McClain |
| 9,418,059 | B1 | 8/2016 | Singliar et al. |
| 10,098,569 | B2 | 10/2018 | Abeyratne et al. |
| 10,529,318 | B2 | 1/2020 | Kurata |
| 10,796,714 | B2 | 10/2020 | Levanon et al. |
| 10,796,805 | B2 | 10/2020 | Lotan |
| 11,062,725 | B2 | 7/2021 | Variani |
| 11,110,239 | B2 | 9/2021 | Troxell |
| 11,219,386 | B2 | 1/2022 | Lesso |
| 11,240,181 | B1 | 2/2022 | Nagaraja et al. |
| 11,574,336 | B1* | 2/2023 | Chan ..................... G06Q 40/08 |
| 11,864,880 | B2 | 1/2024 | Abeyratne |
| 11,877,841 | B2 | 1/2024 | Song |
| 12,070,323 | B2 | 8/2024 | Chou |
| 12,315,530 | B2 | 5/2025 | Usvyat |
| 12,481,926 | B2 | 11/2025 | Ramirez et al. |
| 12,488,805 | B2 | 12/2025 | Haimi-Cohen |
| 12,518,206 | B2 | 1/2026 | Archuleta et al. |
| 12,518,774 | B2 | 1/2026 | Haimi-Cohen |
| 12,518,777 | B2 | 1/2026 | Ramirez et al. |
| 2004/0193419 | A1 | 9/2004 | Kimball et al. |
| 2007/0026406 | A1 | 2/2007 | ElGhaoui et al. |
| 2007/0276278 | A1 | 11/2007 | Coyle et al. |
| 2008/0059152 | A1 | 3/2008 | Fridman et al. |
| 2009/0125623 | A1 | 5/2009 | Garg et al. |
| 2009/0311657 | A1 | 12/2009 | Dodelson et al. |
| 2009/0312660 | A1 | 12/2009 | Guarino |
| 2011/0125044 | A1 | 5/2011 | Rhee |
| 2012/0071777 | A1 | 3/2012 | MacAuslan |
| 2015/0073306 | A1 | 3/2015 | Abeytratne |
| 2016/0045161 | A1 | 2/2016 | Alshaer |
| 2016/0078167 | A1 | 3/2016 | Rosner et al. |
| 2016/0246772 | A1 | 8/2016 | Hoover et al. |
| 2017/0003948 | A1 | 1/2017 | Iyer et al. |
| 2017/0180266 | A1 | 6/2017 | Frank et al. |
| 2017/0278018 | A1 | 9/2017 | Winih et al. |
| 2018/0060512 | A1 | 3/2018 | Sorenson et al. |
| 2018/0182362 | A1 | 6/2018 | Li |
| 2018/0350351 | A1 | 12/2018 | Kopys |
| 2019/0347557 | A1 | 11/2019 | Khan |
| 2019/0348064 | A1 | 11/2019 | Lesso |
| 2020/0008725 | A1 | 1/2020 | Bach et al. |
| 2020/0015709 | A1 | 1/2020 | Peltonen et al. |
| 2020/0027558 | A1 | 1/2020 | Abeyratne et al. |
| 2020/0034553 | A1 | 1/2020 | Kenyon et al. |
| 2020/0125706 | A1 | 4/2020 | Adir et al. |
| 2020/0143267 | A1 | 5/2020 | Gidney |
| 2020/0152330 | A1 | 5/2020 | Anushiravani et al. |
| 2020/0193735 | A1 | 6/2020 | Jung et al. |
| 2020/0210538 | A1 | 7/2020 | Wang et al. |
| 2020/0234188 | A1 | 7/2020 | Maffei Vallim |
| 2020/0323484 | A1 | 10/2020 | Aronovich et al. |
| 2020/0327379 | A1 | 10/2020 | Dong |
| 2020/0337625 | A1 | 10/2020 | Aimone et al. |
| 2020/0381130 | A1 | 12/2020 | Edwards et al. |
| 2020/0388287 | A1 | 12/2020 | Anushiravani et al. |
| 2020/0411036 | A1 | 12/2020 | Daimo |
| 2021/0005184 | A1 | 1/2021 | Rao |
| 2021/0049421 | A1 | 2/2021 | Tandecki et al. |
| 2021/0076977 | A1 | 3/2021 | Abeyratne et al. |
| 2021/0128074 | A1 | 5/2021 | Leydon |
| 2021/0219893 | A1 | 7/2021 | Luz et al. |
| 2021/0234668 | A1 | 7/2021 | Manamohan et al. |
| 2021/0248517 | A1 | 8/2021 | Soppin et al. |
| 2021/0298711 | A1 | 9/2021 | Miri et al. |
| 2021/0338154 | A1 | 11/2021 | Abeyratne |
| 2021/0357586 | A1 | 11/2021 | Archuleta |
| 2021/0361227 | A1 | 11/2021 | Chou et al. |
| 2022/0004935 | A1 | 1/2022 | Lakshmanan |
| 2022/0027725 | A1 | 1/2022 | Nongpiur et al. |
| 2022/0029986 | A1 | 1/2022 | Neumann |
| 2022/0058339 | A1 | 2/2022 | Archuleta |
| 2022/0067445 | A1 | 3/2022 | Archuleta et al. |
| 2022/0108262 | A1* | 4/2022 | Cella ..................... G05B 17/02 |
| 2022/0114273 | A1* | 4/2022 | Njemanze ........... G06N 3/0499 |
| 2022/0122740 | A1 | 4/2022 | Nematiosseinabadi et al. |
| 2022/0130415 | A1 | 4/2022 | Garrison et al. |
| 2022/0215248 | A1 | 7/2022 | Ramirez et al. |
| 2022/0293123 | A1 | 9/2022 | Ramirez et al. |
| 2022/0300856 | A1 | 9/2022 | Archuleta et al. |
| 2022/0309407 | A1 | 9/2022 | Ramirez et al. |
| 2023/0120897 | A1* | 4/2023 | Kozlowski, III ......... H04L 9/32 705/75 |
| 2023/0176557 | A1* | 6/2023 | Cella ................... G05B 13/048 700/117 |
| 2023/0186201 | A1* | 6/2023 | Cella ................. G05B 23/0294 705/7.17 |
| 2023/0196230 | A1* | 6/2023 | Cella ..................... G06V 10/82 705/7.17 |
| 2023/0281527 | A1* | 9/2023 | Cella ..................... G06V 20/17 705/7.17 |
| 2023/0298016 | A1* | 9/2023 | Osborn .................. H04L 63/12 705/41 |
| 2023/0329646 | A1 | 10/2023 | Zhou |
| 2023/0368000 | A1 | 11/2023 | Cox et al. |
| 2024/0127078 | A1 | 4/2024 | Elyaderani et al. |
| 2025/0285640 | A1 | 9/2025 | Carmiel |

FOREIGN PATENT DOCUMENTS

| | | | |
|---|---|---|---|
| WO | 2019155052 | A1 | 8/2019 |
| WO | 2020051256 | A1 | 3/2020 |
| WO | 2020069048 | A1 | 4/2020 |
| WO | 2020104465 | A1 | 5/2020 |
| WO | 2021119742 | A1 | 6/2021 |
| WO | 2021119743 | A1 | 6/2021 |
| WO | 2021253093 | A1 | 12/2021 |
| WO | 2022051523 | A1 | 3/2022 |
| WO | 2022091062 | A1 | 5/2022 |
| WO | 2022147566 | A1 | 7/2022 |
| WO | 2022192606 | A1 | 9/2022 |
| WO | 2022198105 | A1 | 9/2022 |
| WO | 2022204573 | A1 | 9/2022 |
| WO | 2023220665 | A1 | 11/2023 |
| WO | 2023220683 | A1 | 11/2023 |
| WO | 2024059792 | A1 | 3/2024 |
| WO | 2024059796 | A1 | 3/2024 |
| WO | 2021161230 | A1 | 8/2024 |

OTHER PUBLICATIONS

International Search Report in International Application No. PCT/US2023/066888 mailed Sep. 18, 2023.
International Search Report in International Application No. PCT/US2023/072499 mailed Dec. 12, 2023.
Alqudaihi et al., "Cough Sound Detection and Diagnosis Using Artificial Intelligence Techniques: Challenges and Opportunities", IEEE Access, vol. 9, pp. 102327-102344 (Year: 2021).
He et al., "Read, Watch, and Move: Reinforcement Learning for Temporally Grounding Natural Language Descriptions in Videos", Proceedings of the AAAI Conference on Artificial Intelligence, vol. 33, No. 1, pp. 8393-8400, Jul. 17, 2019.

(56)            References Cited

OTHER PUBLICATIONS

Huang et al., "SAP: Self-Adaptive Proposal Model for Temporal Action Detection Based on Reinforcement Learning", Proceedings of the AAAI Conference on Artificial Intelligence, vol. 32, No. 1, pp. 6951-6958, Apr. 27, 2018.

Ashby, "A Novel Cough Audio Pre-Processing and Segmentation Algorithm for COVID-19 Detection," University of Brighton, School of Architecture, Technology and Engineering, Bachelor of Science Thesis, Jun. 2, 2022, www.researchgate.net/profile/Alice-Ashby/publication/363057325.

Ashby et al., "Cough-Based COVID-19 Detection with Audio Quality Clustering and Confidence Measure Based Learning," Conformal and Probabilistic Prediction with Applications, Proceedings of Machine Learning Research, pp. 129-148, Aug. 30, 2022.

Zhang et al., "Novel COVID-19 Screening Using Cough Recordings of a Mobile Patient Monitoring System," 2021 43rd Annual International Conference of the IEEE Engineering in Medicine & Biology Society (EMBC). IEEE, pp. 2353-2357, Nov. 7, 2021.

International Search Report in International Application No. PCT/US2023/066888 mailed Jan. 24, 2024.

Brownlee: A Gentle Introduction to Imbalanced Classification (Year: 2020).

Chen: When Machine Learning Meets Blockchain 2018 (Year: 2018).

Guha: One Shot Federated Learning 2019 (Year: 2019).

Herresthal: Swarm Learning for Decentralized Confidential Clinical ML May 2021 (Year: 2021).

Herresthal: Swarm Learning privacy ML Disease Classification_ 2020 (Year: 2020).

Jackson: City of Jackson COVID19 Symptom Collector Chrysalis Partners Apr. 2020 (Year: 2020).

Jadon: What Happens When You Run a Computer Program 2020 Loading Programs into RAM (Year: 2020).

Kolding: Chrysalis Partners Launches Covid19 Symptom Collector_ Apr 2020 (Year: 2020).

Li: Explicit Inductive Bias for Transfer Learning CNNs 2018 (Year: 2018).

Liu: Bagging based ensemble transfer learning 2016 (Year: 2016).

Liu: Cough Detection Using Deep Neural Networks 2014 (Year: 2014).

Merriam Webster: Compendium Definition & Meaning 2024 (Year: 2024).

Tan: A Survey on Deep Transfer Learning 2018 (Year: 2018).

Weiss: A survey of transfer learning 2016 (Year: 2016).

Zhuang: Comprehensive Survey on Transfer Learning 2020 (Year: 2020).

Al Texsoft. "MLOps: Methods and Tools of DevOps for Machine Learning." Jul. 23, 2020 Retrieved on Jun. 26, 2022 from <https://www.altexsoft.com/blog/mlops-methods-tools/> entire document.

Ratri et al., "A Comparative Study on Signature Recognition", IEEE, pp. 167-171, Nov. 8, 2014. Retrieved from the Internet: Ratri et al., "A Comparative Study on Signature Recognition", IEEE, https://ieeexplore.ieee.org/stamp/stamp.jsp?tp=&arbynber=7065735.

Rodriguez et al. "Hybrid analysis pipelines in the REANA reproducible analysis platform." EPJ Web of Conferences. vol. 245. EDP Sciences, 2020. Nov. 16, 2020. Retrieved on Jun. 26, 2022 from <https://www.epj-conferences.org/articles/epjconf /abs/2020/21 / epjconf _chep2020 _ 06041 /epjco nf_chep2020_06041.html> entire document.

Shen, "Movements Classification of Multi-Channel sEMG Based on CNN and Stacking Ensemble Learning" Special Section on Smart Health Sensing and Computational Intelligence: from Big Data to Big Impacts. IEEE Access, vol. 7, pp. 137489-137500, Oct. 3, 2019.

Stewart "Software as a Medical Device (SAMO): Clinical Evaluation— Guidance for Industry 1-20 and Food and Drug Administration Staff" U.S. Department of Health and Human Services, Food and Drug Administration, Dec. 8, 2017, Retrieved on Jun. 26, 2022 from <https://www.fda.gov/files/medical%20devices/publish_ed/Software-as-a-Medical-Device-%28SAMD% 29-Clinical-Evaluation-Guidance-for-Industry-and-Food-and-Drug-Administration-Staff.pdf> entire document.

Teyhouee, "Cough Detection Using Hidden Markov Models" arxiv. Arxiv.org. Apr. 28, 2019 DOI: ARxIV:1904.12354v1.

* cited by examiner

SYSTEMS AND METHODS FOR CHAINED MACHINE LEARNING MODELS FOR SIGNAL DATA SIGNATURE LABELLING

RELATED APPLICATION(S)

This application claims priority to and the benefit of U.S. Provisional Patent Application No. 63/340,555, filed May 11, 2022, which is incorporated herein by reference in its entirety.

TECHNICAL FIELD

The present invention relates generally to machine learning for signal data signature classification. In particular, the present invention relates to signal data signature event detection, signal data signature classification, utilizing one or more machine learning models and/or reinforcement learning including generalizable reward mechanisms derived from the underlying distribution of signal data signatures used to train a machine learning model.

BACKGROUND ART

The conventional systems and methods for event detection in signal data is limited by software programs that require human input and human decision points, algorithms that fail to capture the underlying distribution of a signal data signature, algorithms that are brittle and unable to perform well on datasets that were not present during training.

SUMMARY OF THE DISCLOSURE

Embodiments of the present disclosure may include signal data signature event detection including recognizing signal data signature events and respective temporal start and end times in a signal data signature recording. Signal data signature event detection aims at processing a continuous acoustic signal and converting it into symbolic descriptions of the corresponding signal data signature events as well as the timing of those events. Signal data signature event detection has many different commercial applications such as context-based indexing, retrieval in multimedia databases, unobtrusive monitoring in health care, surveillance, and medical diagnostics.

In some embodiments, signal data signature event detection may enable classification and tagging of signal data signatures. In some embodiments, signal data signature event detection may include a signal data signature detection system that may include hardware devices (e.g. desktop, laptop, servers, tablet, mobile phones, etc.), storage devices (e.g. hard drive disk, floppy disk, compact disk (CD), secure digital card, solid state drive, cloud storage, etc.), delivery devices (paper, electronic display), a computer program or plurality of computer programs, and a processor or plurality of processors. A signal data signature detection system when executed on a processor (e.g., CPU, GPU) would be able to identify a signal data signature such as a cough or type of a cough from other types of cough and/or signal data signature and delivered to clinicians and/or end-users through a delivery device (paper, electronic display).

Embodiments of the present disclosure may include a signal data signature detection system for performing edits on the signal data signature recording and producing a modified signal data signature recording that matches with a target signal data signature recording distribution. The signal data signature detection system includes: a signal data signature recording; a physical hardware device comprising a memory unit and processor; software instructions comprising at least one computer program; a display media; wherein the memory unit is configured to store the signal data signature recording created by the physical interface on a temporary basis; wherein the memory unit is configured to store the data sources created by the physical interface on a temporary basis; wherein the memory unit is configured to store the at least one computer program on a temporary basis; wherein the processor is configured to execute the software instructions of the at least one computer program in the memory unit, wherein the software instructions, upon execution, cause the processor to perform steps to: provide the reinforcement learning system and the signal data signature recording and a minimum distance window which constrains the agent to only perform actions within the minimum distance window; provide the reinforcement learning agent with a reward function wherein the reward function uses an chain oracle NN model and returns a positive reward if the signal data signature recording is a match with the target distribution; provide the reinforcement learning agent with a reward function wherein the reward function uses an chain oracle NN model and returns a positive reward if there is a net gain in concordance between a modified signal data signature recording and the target distribution when compared with the previous signal data signature recording state; provide the reinforcement learning agent with a reward function wherein the reward function uses an chain oracle NN model and returns a negative reward if there is a net loss in concordance between a modified signal data signature recording and the target distribution when compared with the previous signal data signature recording state; provide the reinforcement learning agent with a pool of states, actions, and rewards and a function approximator wherein using the function approximator the reinforcement learning agent predicts the best action to take resulting in maximum reward; wherein the reinforcement learning agent optimizes a policy such the agent learns modifications to make to an onset timing and an offset timing within the minimum distance window to match the signal data signature recording with the target distribution; and output to the display media: an output labeled signal data signature recording that is labeled with the onset timing and the offset timing and an output type of the output labeled signal data signature recording.

Embodiments of the present disclosure include another signal data signature detection system for signal data signature detection. The signal data signature detection system includes: at least one processor configured to execute software instruction, wherein the software instructions, upon execution, cause the at least one processor to perform steps to: receive a first state comprising: i) a signal data signature recording; wherein the signal data signature recording comprises a signal data signature associated with a source of the signal data signature recording, ii) a first onset location within the signal data signature recording, wherein the first onset location comprises a beginning of the signal data signature within the signal data signature recording, iii) a first offset location within the signal data signature recording, wherein the first offset location comprises an end of the signal data signature within the signal data signature recording; receive a first reward associated with the first state; determine an action to produce a second state based on the first state, the first reward and a policy of a reinforcement learning agent, wherein the second state comprises: i) the signal data signature recording; ii) a second onset location within the signal data signature recording, wherein the second onset location comprises a modified beginning of the signal data signature within the signal data signature recording, iii) a second offset location within the signal data signature recording, wherein the second offset location comprises a modified end of the signal data signature within the signal data signature recording; utilize a recurrent neural network to determine a match score representative of a similarity between the second state and a target distribution of a signal data signature type based at least in part on the second state and model parameters trained against the target distribution; determine a second reward based on the match score; determine, based on the second reward exceeding a maximum reward threshold, a modified signal data signature recording comprising the signal data signature having the modified beginning and the modified end; and instruct a user device to display the modified signal data signature recording and the signal data signature type to a user to indicate a matching signal data signature type.

Embodiments of the present disclosure include a signal data signature detection method for signal data signature detection. The method includes: receiving, by at least one processor, a first state comprising: i) a signal data signature recording; wherein the signal data signature recording comprises a signal data signature associated with a source of the signal data signature recording, ii) a first onset location within the signal data signature recording, wherein the first onset location comprises a beginning of the signal data signature within the signal data signature recording, iii) a first offset location within the signal data signature recording, wherein the first offset location comprises an end of the signal data signature within the signal data signature recording; receiving, by at least one processor, a first reward associated with the first state; determining, by at least one processor, an action to produce a second state based on the first state, the first reward and a policy of a reinforcement learning agent, wherein the second state comprises: i) the signal data signature recording; ii) a second onset location within the signal data signature recording, wherein the second onset location comprises a modified beginning of the signal data signature within the signal data signature recording, iii) a second offset location within the signal data signature recording, wherein the second offset location comprises a modified end of the signal data signature within the signal data signature recording; utilizing, by at least one processor, a recurrent neural network to determine a match score representative of a similarity between the second state and a target distribution of a signal data signature type based at least in part on the second state and model parameters trained against the target distribution; determining, by at least one processor, a second reward based on the match score; determining, based on the second reward exceeding a maximum reward threshold, by at least one processor, a modified signal data signature recording comprising the signal data signature having the modified beginning and the modified end; and instructing, by at least one processor, a user device to display the modified signal data signature recording and the signal data signature type to a user to indicate a matching signal data signature type.

Embodiments of the present disclosure include a signal data signature detection computer programming product for signal data signature detection. The computer programming product includes a non-transitory computer readable medium having software instructions stored thereon, the software instructions configured to cause at least one processor to perform steps comprising: receive a first state comprising: i) a signal data signature recording; wherein the signal data signature recording comprises a signal data signature associated with a source of the signal data signature recording, ii) a first onset location within the signal data signature recording, wherein the first onset location comprises a beginning of the signal data signature within the signal data signature recording, iii) a first offset location within the signal data signature recording, wherein the first offset location comprises an end of the signal data signature within the signal data signature recording; receive a first reward associated with the first state; determine an action to produce a second state based on the first state, the first reward and a policy of a reinforcement learning agent, wherein the second state comprises: i) the signal data signature recording; ii) a second onset location within the signal data signature recording, wherein the second onset location comprises a modified beginning of the signal data signature within the signal data signature recording, iii) a second offset location within the signal data signature recording, wherein the second offset location comprises a modified end of the signal data signature within the signal data signature recording; utilize a recurrent neural network to determine a match score representative of a similarity between the second state and a target distribution of a signal data signature type based at least in part on the second state and model parameters trained against the target distribution; determine a second reward based on the match score; determine, based on the second reward exceeding a maximum reward threshold, a modified signal data signature recording comprising the signal data signature having the modified beginning and the modified end; and instruct a user device to display the modified signal data signature recording and the signal data signature type to a user to indicate a matching signal data signature type.

Embodiments of the present disclosure include systems, methods and/or non-transitory computer readable media for signal data signature detection, including steps to: train the recurrent neural network, wherein training the recurrent neural network comprises: receiving, by a sequential SDS machine learning model, the target distribution; generating, by the sequential SDS machine learning model, a plurality of simulated distributions based on the target distribution; receiving, by the recurrent neural network, a plurality of distributions comprising the target distribution and the plurality of simulated machine distributions; determining, by the recurrent neural network, a respective match score for each respective distribution of the plurality of distributions; determining, by the recurrent neural network, at least one matching distribution of the plurality of distributions based on the respective match score for each respective distribution of the plurality of distributions; and training the recurrent neural network based on a difference between the at least one matching distribution and the target distribution.

Embodiments of the present disclosure include systems, methods and/or non-transitory computer readable media for signal data signature detection, including steps to: determine a net change in concordance between the second state and the target distribution based on the match score; wherein the net change comprises at least one of: a net gain in concordance, and a net loss in concordance; and determine the reward based on the net change.

Embodiments of the present disclosure include systems, methods and/or non-transitory computer readable media for signal data signature detection, including steps to: determine a difference between the first onset location and the first offset location in the signal data signature recording; and determine the action as a modification to at least one of the first onset location and the second onset location that maintains the difference within a maximum window.

Embodiments of the present disclosure include systems, methods and/or non-transitory computer readable media for signal data signature detection, including steps to: determine a difference between the first onset location and the first offset location in the signal data signature recording; and determine the action as a modification to at least one of the first onset location and the second onset location that maintains the difference to be greater than a minimum window.

Embodiments of the present disclosure include systems, methods and/or non-transitory computer readable media for signal data signature detection, including steps to: utilize a function approximator machine learning model to produce an updated policy based on the first state, the action, the second state and the second reward; wherein the updated policy comprises at least one modified parameter of the policy.

Embodiments of the present disclosure include systems, methods and/or non-transitory computer readable media for signal data signature detection, including, wherein the function approximator machine learning comprises a deep learning neural network.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

Figure 1:
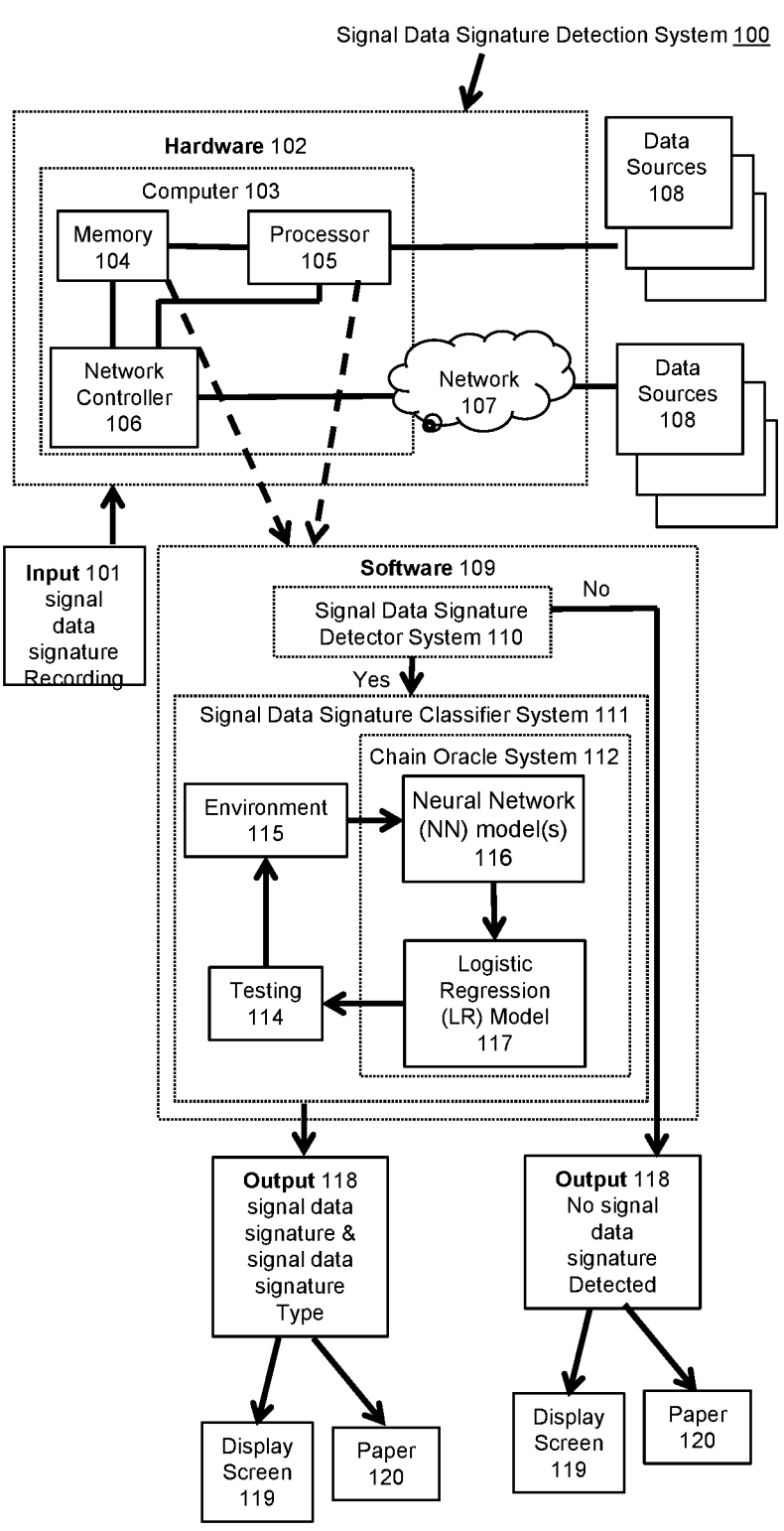
FIG. 1 illustrates a signal data signature detection system according to aspects of embodiments of the present disclosure.

| Drawings - - - Reference Numerals | |
|---|---|
| 100 Signal data signature Signal data signature Detection System | 101 Signal data signature Recording |
| 102 Hardware | 103 Computer |
| 104 Memory | 105 Processor |
| 106 Network Controller | 107 Network |
| 108 Data Sources | 109 Software |
| 110 Signal data signature Detector System | 111 Signal data signature Classifier System |
| 112 Chain Oracle System | |
| 114 Testing | 115 Environment |
| 116 Neural Network (NN) Model(s) | 117 Logistic Regression (LR) Model |
| 118 Signal data signature & Signal data signature Type Output | 119 Display Screen |
| 120 Paper | 200 Modified signal data signature recording |
| 201 Pool of states (signal data signature recording, action, reward) | 202 Function Approximator |
| 300 Example Actions | 301A NN Model(s) |
| 301B LR Model | 302 Chain Oracle |
| | 300 Transfer Learning |
| 310 RL-agent selects Action | 312 Neural Network Function Approximator |
| 313 Error Back Propagation | 314 Forward Propagation |

DETAILED DESCRIPTION

This specification describes illustrative embodiments of a signal data signature detection system that includes a reinforcement learning system and a discriminator of a recurrent neural network as computer programs one or more computers in one or more locations. The signal data signature detection system components include input data, computer hardware, computer software, and output data that can be viewed by a hardware display media or paper. A hardware display media may include a hardware display screen on a device (computer, tablet, mobile phone), projector, and other types of display media.

In some embodiments, the system may perform signal data signature event detection on a signal data signature recording using a reinforcement learning system such that an agent learns a policy to identify the onset and offset timings in a signal data signature recording that result in a signal data signature distribution that the discriminator of a recurrent neural network has been trained to detect. An environment that is the signal data signature recording, an agent, a state (e.g., onset and offset tags), an action (e.g., adjusting the onset or the offset tag), and a reward (positive—net gain in minimizing cross entropy between target distribution and test distribution, negative—net loss in minimizing cross entropy between target distribution and test distribution) are the components of a reinforcement learning system. The reinforcement learning system is coupled to a real-time chain oracle the discriminator of a recurrent neural network such that each action (e.g. adjustment of onset or offset tags) made by an agent to the signal data signature recording results in a positive reward if the signal data signature recording has a net gain for minimizing the cross entropy between the target and test distributions or a negative reward if the signal data signature recording has a net loss for minimizing the cross entropy between the target and test distributions.

In some embodiments, a reinforcement learning agent is learning a policy to optimize total future reward such that actions performed result in strong labeling and signal data signature type matching to the targeted signal data signature type distribution. A signal data signature type distribution has a characteristic temporal profile that the discriminator of a chain oracle has been optimized to detect. Training the models of the chain oracle, from the standpoint of game theory, is similar to setting a minimax two-player game whereby both networks try to beat each other and in doing so, they both become better and better. The goal of the chain oracle is to maximize concurrent True and False results from sequential data. The goal of the discriminator is to detect True—True and False—False result sets, so neural network(s) may be used a discriminator in the chain oracle along with one or more logistic regression models and be trained to minimize the final classification error.

In some embodiments, the reinforcement learning agent may optimize the policy to tag the onset and offset timings such that the reinforcement learning agent may match the strong-label target distribution that the discriminator was trained on as part of a chain oracle system. For example, the reinforcement-learning agent may be provided with a weakly labeled signal data signature recording of a bronchitis cough, and the trained to learn a policy to adjust the onset and offset labels of the recording such that it matched closely to the strongly labeled distribution of bronchitis cough data that the discriminator of the chain oracle has been trained with. In some embodiments, a reinforcement-learning agent may be provided with a weakly or strongly labeled signal data signature recording of one or more-of various sound events to converge on a policy for isolating the sound event(s) via onset and offset timings by leveraging a chain oracle and/or reward mechanism including the discriminator trained with a dataset of sound events of the same type. In some embodiments, to facilitate efficient use of processing resources, the reinforcement learning agent may be bound by a maximum iteration threshold defined by a maximum number of iterations such that if a match is not detected within the given maximum iteration threshold a negative detection flag is returned.

In some embodiments, the signal data signature tagging (e.g., placement of onset and offset tags) by the reinforcement learning agent may include strongly labeled signal data signature. Herein, the terms "strongly labeled", "strong labeled", "strong label" and/or variations thereof refer to labeling and/or labels that include temporal information. Oftentimes signal data signature recordings are weakly labeled with a presence/absence label, which only states what types of events are present in each recording without any temporal information. A reinforcement-learning agent learns a policy to identify the onset and offset timings of a signal data signature such that the signature matches the targeted strong-labeled (known onset and offset timings) distribution of a known signal data signature.

In some embodiments, the signal data signature tagging (e.g., placement of onset and offset tags) by the reinforcement learning agent may include a minimal distance window. A minimal distance window may be used to constrain an agent to maintain a set minimal distance between the onset and offset tags. A minimal distance window for example can be set by the shortest distance between onset and offset tags observed in a distribution of signal data signature events types or the distribution of a single signal data signature event as well as other distance metrics. The minimal distance window is advantageous for capturing a temporal profile of the targeted signal data signature event. Whereas as the reinforcement learning agent not constrained by a minimal distance window could learn a policy to minimize the distance between the onset and offset tags such that the signal data signature profile becomes ambiguous and loses specificity while at the same time producing a maximum reward for the agent.

In some embodiments, the signal data signature tagging (e.g., placement of onset and offset tags) by the reinforcement learning agent may include a maximum distance window. A maximum distance window is used to constrain the search space to a maximal timing based on the signal data signature event type. A maximum distance window for example can be set by the longest distance between onset and offset tags observed in a distribution of signal data signature events types or the distribution of a single signal data signature event as well as other distance metrics that are captured from the targeted signal data signature event. The maximum distance window is advantageous for reducing computational resources and maximizing performance of the signal data signature signal data signature detection system.

In some embodiments, the signal data signature tagging (e.g., placement of onset and offset tags) by the reinforcement learning agent may include a generalizable reward mechanism, a real-time discriminator of a chain oracle. A real-time discriminator of a chain oracle, when provided with a signal data signature recording, data sources (e.g., training data), computer hardware including a memory and a processor(s), and a computer program or computer programs when executed by a processor, outputs one of two values that specifies whether a particular signal data signature recording is match or not a match with the targeted signal data signature distribution.

In some embodiments, a transfer learning approach may be leveraged that combines both one or more neural network models and an LR model. In some embodiments, the discriminator of the chain oracle, which may be trained in a clean data environment to recognize the underlying target distribution in sequential data. The discriminator may be a machine learning model, such as, e.g., one or more exemplary AI/machine learning techniques chosen from, but not limited to, decision trees, boosting, support-vector machines, neural networks, nearest neighbor algorithms, Naive Bayes, bagging, random forests, among others or any combination thereof. In some embodiments, the discriminator may be a recurrent model such as a recurrent neural network. The functional approximator, which could represent a recurrent neural network, convolutional neural network, support vector machine, logistic regression, conditional random fields among others or any combination thereof, may define the discriminative model. In some embodiments, the reinforcement-learning agent performs actions setting the timings of the onset and offset while testing a match between the target distribution that the recurrent model was trained on by inputting a portion of the signal data signature recording between the onset and offset timings into the recurrent model to output a determination of match or no match. In some embodiments, the recurrent model returns a positive reward for an improvement in the overlap between the portion of the signal data signature recording and the targeted distribution. In some embodiments, the reinforcement-learning agent, having accumulated training signals in the form of signal data signature recordings (states), modifications to onset and offset (actions), net gain or net loss in overlap between distributions (rewards) may leverage a function approximator. The function approximator, which may include a discriminative model, may then predict which action of the reinforcement learning agent to take to maximize the future reward as a consequence of the reinforcement learning agent being trained to optimize a policy the discriminative model is learning from the recurrent model.

Advantages of an LR model as the discriminative model learning from the recurrent model may include the following 1) a NN model requires less training data, 2) a NN model can compensate for missing data, 3) LR models may be more accurate when the conditional independence assumption is not satisfied, The details of one or more embodiments of the subject matter of this specification are set forth in the accompanying drawings and the description below. Other features, aspects, and advantages of the subject matter will become apparent from the description, the drawings, and the claims.

Signal Data Signature Detection System

In some embodiments, a signal data signature detection system may identify whether or not a sample signal data signature distribution matches a target signal data signature distribution associated with a particular signal data signature indicative of a particular signal condition. In some embodiments, identifying the sample signal data signature distribution may include identifying a location of the onset and offset timings. These embodiments are advantageous for identifying signal data signature events that are captured in the wild in order to automatically detect particular signal conditions including signal sources, such as, e.g., acoustic sources of acoustic signals, electronic sources of electronic signals or other signal sources, or of a condition of a signal source, such as, e.g., health conditions of a person, operational and/or maintenance related condition of mechanical and/or electrical and/or electronic equipment, among other conditions or any suitable combination thereof.

In order to achieve a software program that is able, either fully or partially, to detect signal data signature events, that program matches the sample distribution to a target distribution that a recurrent model is trained to recognize. Another goal of the invention is to provide strong labeling of the onset and offset timings of the sample distribution. Another challenge is that such a program must be able to scale and process large datasets.

Embodiments of the invention are directed to a signal data signature detection system whereby a signal data signature recording is provided by an individual or individuals(s) or system into a computer hardware whereby data sources and the input target distribution are stored on a storage medium and then the data sources and input target distribution are used as input to a computer program or computer programs which when executed by a processor or processor provides the strong labeled signal data signature recording and the signal data signature type which are provided to an individual or individual(s) on a display screen or printed paper.

FIG. 1 illustrates a signal data signature detection system 100 with the following components: signal data signature recording 101, hardware device(s) 102, software 109, and output. The input is a signal data signature recording such as a signal data signature recording captured by a sensor, a signal data signature recording captured on a mobile device, and a signal data signature recording captured on any other device, among others. The signal data signature recording 101 may be provided by an individual, individuals or a system and recorded by a hardware device(s) 102 such as a computer 103 with a memory 104, processor 105 and or network controller 106. A hardware device is able to access data sources 108 via internal storage or through the network controller 106, which connects to a network 107.

In some embodiments, the data sources 108 that are retrieved by a hardware device(s) 102 in one of other possible embodiments includes for example but not limited to: 1) a corpus of strong labeled signal data signature recordings, 2) a corpus of weakly labeled signal data signature recordings, 3) a continuous stream of signal data signature recordings, 4) a sample signal data signature recording, 5) video recordings, 6) text related signal data signature recordings, 7) features of signal data signature recordings.

In some embodiments, the data sources 108 and the signal data signature recording 101 are stored in memory or a memory 104 and passed to a software 109 such as computer program or computer programs that executes the instruction set on a processor 105. The software 109 being a computer program executes a signal data signature detector system 110 and a signal data signature classification system 111. The signal data signature classification system 111 executes a chain oracle system 112 on a processor 105 such that, a Neural Network (NN) model(s) 116 configuration is optimized and deployed in a chain configuration with a logistic regression (LR) LR model 117. In some embodiments, the chain oracle system 112 may perform a classification task and/or may be deployed in a reinforcement learning system that modifies the onset and offset timings to the signal data signature recording while ensuring that the edits result in a match to the target distribution, or deployed to any other suitable application. The output including a strongly labeled signal data signature recording 118 may be either strongly labeled signal data signature recording and signal data signature type or a flag with no signal data signature detected that can be viewed by a reader on a display screen 119 or printed on paper 120.

In one or more embodiments of the signal data signature detection system 100, hardware device(s) 102 includes the computer 103 connected to the network 107. The computer 103 is configured with one or more processors 105, a memory 104, and one or more network controllers 106. It can be understood that the components of the computer 103 are configured and connected in such a way as to be operational so that an operating system and application programs may reside in a memory 104 and may be executed by the processor or processors 105 and data may be transmitted or received via the network controller 106 according to instructions executed by the processor or processor(s) 105. In one embodiment, a data source 108 may be connected directly to the computer 103 and accessible to the processor 105, for example in the case of a signal data signature sensor, imaging sensor, or the like. In one embodiment, a data source 108 may be executed by the processor or processor(s) 105 and data may be transmitted or received via the network controller 106 according to instructions executed by the processor or processors 105. In one embodiment, a data source 108 may be connected to the chain oracle system 112 remotely via the network 107, for example in the case of media data obtained from the Internet. The configuration of the computer 103 may be that the one or more processors 105, memory 104, or network controllers 106 may physically reside on multiple physical components within the computer 103 or may be integrated into fewer physical components within the computer 103, without departing from the scope of the invention. In one embodiment, a plurality of computers 103 may be configured to execute some or all of the steps listed herein, such that the cumulative steps executed by the plurality of computers are in accordance with the invention.

In some embodiments, a physical interface is provided for embodiments described in this specification and includes computer hardware and display hardware (e.g., the display screen of a mobile device). In some embodiments, the signal data signature detection system 100 may include computer hardware and/or executable software which is stored on a computer-readable medium for execution on appropriate computing hardware. The terms "computer-readable medium" or "machine readable medium" should be taken to include a single medium or multiple media that store one or more sets of instructions. The terms "computer-readable medium" or "machine readable medium" shall also be taken to include, but not be limited to, solid-state memories, and optical and magnetic media. For example, "computer-readable medium" or "machine readable medium" may include Compact Disc Read-Only Memory (CD-ROMs), Read-Only Memory (ROMs), Random Access Memory (RAM), and/or Erasable Programmable Read-Only Memory (EPROM). The terms "computer-readable medium" or "machine readable medium" shall also be taken to include any non-transitory storage medium that is capable of storing, encoding or carrying a set of instructions for execution by a machine and that cause a machine to perform any one or more of the methodologies described herein. In other embodiments, some of these operations might be performed by specific hardware components that contain hardwired logic. Those operations might alternatively be performed by any combination of programmable computer components and fixed hardware circuit components.

In one or more embodiments of the signal data signature classifier system 111 software 109 includes the chain oracle system 112 which will be described in detail in the following section.

In one or more embodiments of the signal data signature detection system 100 the output including a strongly labeled signal data signature recording 118 includes a strongly labeled signal data signature recording and identification of signal data signature type. An example would be cough sample from a patient which would included: 1) onset and offset timings of the signal data signature recording that capture the cough onset and offset, 2) a label of a condition presence (e.g., presence of a health related condition such as the common cold, influenza, COVID-19, pneumonia, tuberculosis bronchitis, among others or any combination thereof) as the identified signal data signature type, 3) or flag that tells the user that a cough was not detected. The output including a strongly labeled signal data signature recording 118 of strong labeled signal data signature recording and signal data signature type or message that a cough was not detected will be delivered to an end user via a display medium such as but not limited to a display screen 119 (e.g., tablet, mobile phone, computer screen) and/or paper 120.

In one or more embodiments, the chain oracle system 112 may include a real-time chain oracle, NN model(s) 116, and a LR model 117. In some embodiments, the chain oracle may include both the NN model(s) 116 and the LR model 117, or the chain oracle may include the NN model(s) 116 or the LR model 117.

LR Model:

In some embodiments, a logistic regression (LR) model component is used to enhance the performance of the neural network (NN) models relative to what the neural network models may achieve on their own. The LR model takes inputs in the form of model predictions from the NN models that are then weighted to inform the final decision/output of the system.

In some embodiments, to train the LR model, two training sets may be employed, an LR model training set for training the LR model, and an NN model training set for the training multiple NN models. In some embodiments, the NN models may each be initially trained on the NN model training set, and then the NN models may be tested, e.g., using the LR model training set, to select top performing models based on one or more performance metrics of each NN model, where the LR model training set is distinct from the NN training set. The LR model may then be trained using the top selected models and then tested on another distinct dataset. This distinct test dataset may be used to determine the performance of the LR model.

LR Model Background:

In some embodiments, the training probabilities from the NN models may be combined into a LR model and, and the resulting LR model may then be applied to the test dataset. Once each model is trained, it is applied to the data to generate probabilities, which represent the model's confidence that each NN model feature belongs to each class. The probabilities from each NN model are then used as inputs to a new logistic regression (LR) model that is trained to predict the target variable based on the probabilities produced by the individual models. The difficulty is knowing which models to include. In some embodiments, including all of NN models may generate unacceptably high noise and, as a result, lower accuracy. On the other hand, too few NN models may result in a decrease in potential accuracy.

In some embodiments, to automatically determine the number of NN models and which NN models to include in the chain oracle, an automated selection process may be performed where, first, n number of NN models are iterated (e.g., if 50 NN models are the upper limit, each grouping of 1 through 50 NN models may be tested). For each grouping of NN models, 100 trials or more may be iterated through. For each trial, 100 random selections of n NN models may be performed, and with each selection of n NN models, 100 LR models may be calculated with calculated scores. The LR models with the greatest scores may be recorded, and the next grouping may be tested.

Upon completing the trials on each grouping of NN models, the system may output the grouping of n NN models with the best accuracy. Additionally, trials may then be performed to improve upon the scores. In some embodiments, the best performing model may be used to obtain metrics regarding model performance. For example, the metrics may include e.g., a ratio of Positive percent agreement (PPA) to Positive predictive value (PPV), a ratio of Negative percent agreement (NPA) to Negative predictive value (NPV), PPA, PPV, NPA, NPV, Confusion matrix, Accuracy, Sensitivity, Specificity, F1 score, Area Under ROC curve (AUC), Logarithmic Loss (LOGLOSS), Mean Absolute Error (MAE), Mean Square Error (MSE), R Squared (R2), among others or any combination thereof.

Chain Oracle:

In some embodiments, once the LR model is trained, it may then be used in conjunction with a Chain Oracle. The chain oracle combines the LR model with one or more top performing NN models that to most accurately predict one of the two classes, e.g., according to a high sensitivity and/or specificity.

In some embodiments, the chain oracle may be tested and modified according to the following logic in order to optimize a combination of an NN model with the LR model:

1) Calculate NPA/Specificity for all NN models,
2) Sort NN models by NPA/Specificity,
3) Take the NN model with the highest NPA and use it as model 1 in the chain oracle, and use the LR model as model 2,
4) Test the performance of the chain oracle based on the output of the LR model, 5) Compare the performance with performance of a previous iteration using a different NN model, 6) If no improvement is found, keep going down the chain until scores rise (if at all)

In some embodiments, the chain oracle may be implemented as illustrated in the following pseudocode:

---

Pseudocode 1:

---

```
predictions_list = [ ]
Input -> Model 1 -> Prediction1
    If Prediction1 == Not Covid:
        predictions_list.append(prediction1)
    Input -> LRmodel -> Prediction2
    else:
        predictions_list.append(prediction2)
```

---

In some embodiments, the predictions in the predictions_list may be compared to the ground truth to calculate the final scores of each NN model.

Figure 2:
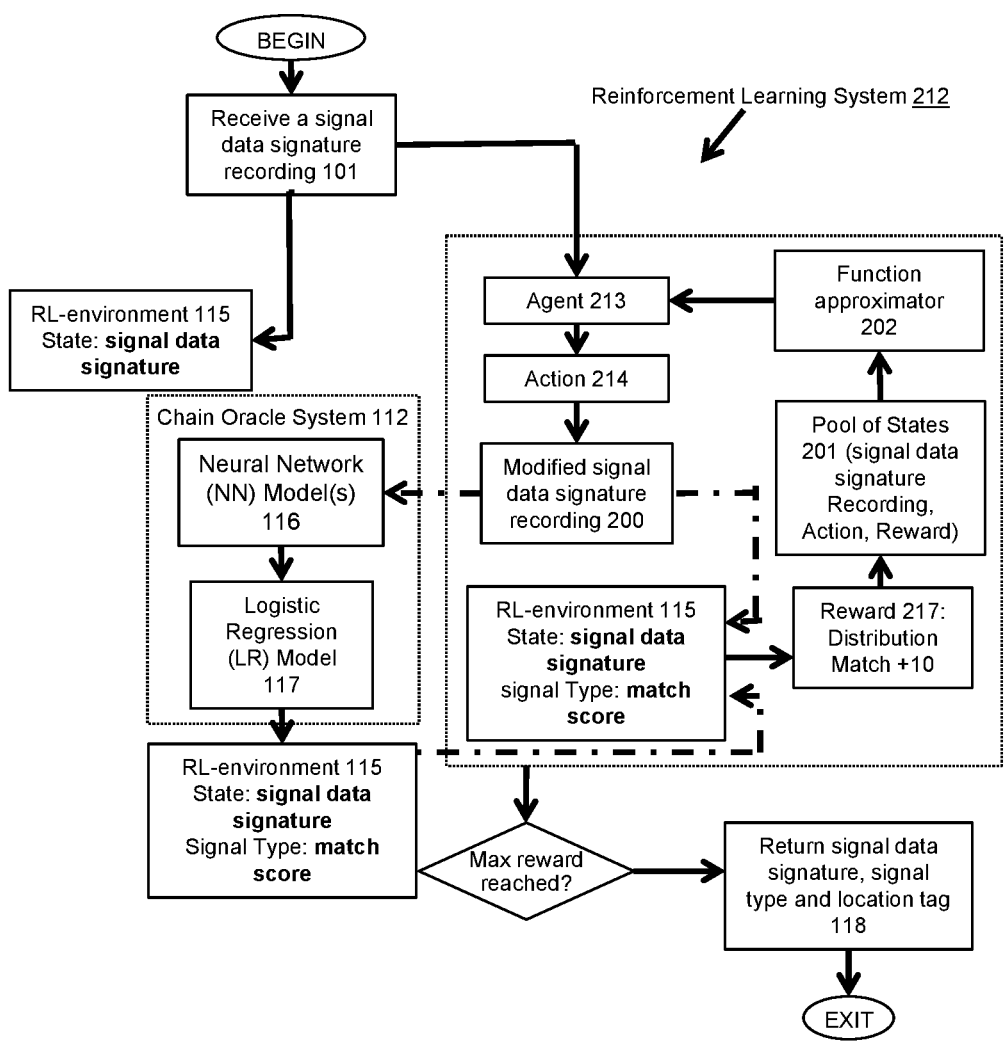
FIG. 2 depicts a reinforcement learning system according to aspects of embodiments of the present disclosure.

In some embodiments, the chain oracle system 112 may include an signal data signature recording 101, hardware device(s) 102, software 109, and output including a strongly labeled signal data signature recording 118. FIG. 2. illustrates an input to the chain oracle system 112 that may include but is not limited to a signal data signature recording 101 that is preprocessed and either modified or unmodified by another computer program or computer programs from the signal data signature recording 101. Another input includes data sources 108 that are provide to the chain oracle NN model(s) 116 and function approximator 202 and will be described in the following sections.

In one or more embodiments, the chain oracle system 112 may use hardware device(s) 102, which may include a memory 104, and processor 105 such that software 109, a computer program or computer programs is executed on a processor 105 and modify the onset and offset tags of the signal data signature recording resulting in a strongly labeled signal data signature recording 118. The output from chain oracle system 112 is reconstructed to produce a strongly labeled signal data signature recording 118 that matches a target distribution. A user is able to view the strongly labeled signal data signature recording 118 and signal data signature type output including a strongly labeled signal data signature recording 118 on a display screen 119 or printed paper 120.

FIG. 2 depicts a reinforcement learning system 212 with an signal data signature recording 101 and an environment that holds state information including the signal data signature recording, and the match score; such that an agent 213 performs actions 214 on the onset and offset labels; and the chain oracle system 112, including an NN model(s) 116 and an LR model 117, may be used as the reward mechanism returning a positive reward 217 if the modified signal data signature recording 200 has a net gain in concordance with the target distribution and a negative reward if the modified signal data signature recording 200 has a net loss in concordance with the target distribution. An agent receiving the signal data signature recording is able to perform actions 214 (e.g., adding to onset timing, subtracting from onset timing, adding to offset timing, subtracting from offset timing, or combination of actions) on the signal data signature recording resulting in a new modified signal data signature recording 200. The modified signal data signature recording 200 is updated in the environment and then passed to the chain oracle system 112 which updates the environment with a match score that specifies a signal data signature recording state (True-net gain in concordance with target distribution, False-net loss in concordance with target distribution). The chain oracle system 112 also returns a reward 217 to the Reinforcement Learning (RL)-environment 115 such that a change resulting in a net gain in concordance with the target distribution results in a positive reward and a net loss in concordance with the target distribution results in a negative reward.

In some embodiments, a pool of states 201 saves the state (e.g., signal data signature recording), action (e.g., adding to onset), reward (e.g., positive). After exploration and generating a large pool of states 201, a function approximator 202 is used to predict an action that will result in the greatest total reward. The reinforcement learning system 212 is thus learning a policy to perform edits to a signal data signature recording resulting in an exact match with the target distribution. One or more embodiments specify termination once a maximum reward is reached and returns a strongly labeled signal data signature recording 118 and signal data signature type. Additional embodiments may have alternative termination criteria such as termination upon executing a certain number of iterations among others. In some embodiments, for given input signal data signature recordings 200 it may not be possible to produce concordance with the target distribution in such instances a message will be returned that informs the user that the signal data signature was not detected.

Figure 3:
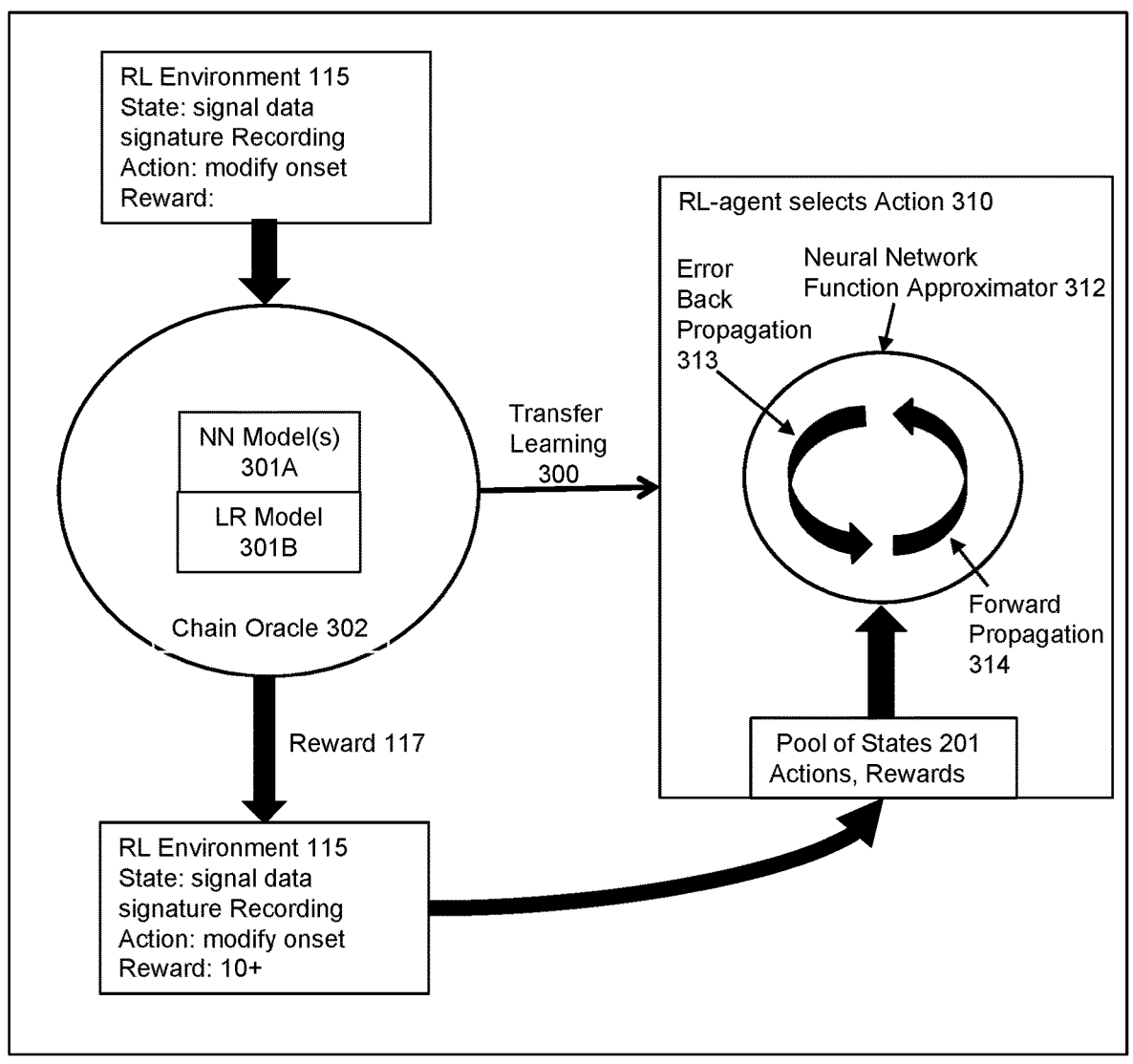
FIG. 3 illustrates transfer learning between the NN model, and the discriminative model function approximator according to aspects of embodiments of the present disclosure.

FIG. 3 illustrates a reinforcement learning system 212 with a transferrable learning mechanism. In some embodiments, the transfer learning is occurring between a chain oracle 302 (e.g., the chain oracle system 112, having an NN model(s) 301A and an LR model 302B) and a function approximator 202 (e.g. convolutional neural network CNN). Accordingly, in some embodiments, weights and/or parameters of the NN model(s) 301A and/or the LR model 302B may be transferred to a neural network function approximator 312 of the function approximator 202 to provide a base model that may be optimized for to enable the RL-agent to select more accurate actions 310.

In some embodiments, the function approximator 202 may be optimized by learning an optimized learning policy whereby a minimal number of modifications to the onset and offset timings results in a strong label signal data signature recording. In some embodiments, the RL-agent 300 may utilize on-policy learning whereby the RL-agent 300 both explores new states and exploits past experiences. In some embodiments, the RL-agent 300 may implement on-policy learning including searching for the optimal policy while also acting on that same policy.

In some embodiments, the RL-agent 300 selects an action 310 to maximize the total future reward using the function approximator 202. In some embodiments, to train the function approximator 202, the chain oracle 302 may, as detailed above, determine whether the actions made by the RL-agent 300 improve the concordance with the target distribution when assigning the reward. In some embodiments, based on a pool of states 201 having each action and each associated reward, the neural network function approximator 312 may maximize the total future reward given prior experience as per the pool of states 201. The function approximator 312 trains on the pool of states 201, produces an estimate by forward propagation 304 and adjust its weights by back propagating the error back propagation 313 between the predicted action 310 affecting onset and offset timings and the reward generated by the chain oracle 302 using stochastic gradient descent. As the Neural network function approximator 312 of the function approximator 202 improves based on the RL-agent actions and reward from the chain oracle 302, the chain oracle 302 may use an ensemble model that uses the predictions of the LR model (based on the features generated by the RL-agent and improved NN models).

Operation of Reinforcement Learning System

In some embodiments, the reinforcement learning system 212 may include a chain oracle 302, e.g., the chain oracle system 112, such that the modified signal data signature recording 200 can be evaluated in real-time and a set of actions performed on the onset and offset timing. In some embodiments, the signal data signature recording and thus its attributes (e.g. match score) represents the RL-environment 115. A RL-agent 300 can interact with a signal data signature recording and receive a reward such that the RL-environment 115 and RL-agent 300 represent a Markov Decision Process (MDP). The MDP is a discrete time stochastic process such that at each time step the MDP represents some state s, (e.g. signal data signature recording with position of onset or offset) and the RL-agent 300 may choose any action a that is available in state s. The process responds at the next time step by randomly moving to a new state s'2 and passing new state s'2 residing in memory to a real-time chain oracle that when executed on a processor returns a corresponding reward Ra (s,s2) for s'2.

The benefits of this and other embodiments include the ability to evaluate and modify the onset and offset timings in real-time. In some embodiments, the reinforcement learning system 212 including the chain oracle 302, e.g., the chain oracle system 112, may improve many areas of signal data signature event detection in which a signal data signature recording needs to be identified and strongly labeled. These applications may include context-based indexing and retrieval in multimedia databases, unobtrusive monitoring in healthcare and surveillance, noise monitoring solutions, and healthcare diagnostics among others. These and other benefits of one or more aspects will become apparent from consideration of the ensuing description.

In some embodiments, an RL-agent 300 may produce actions to model and/or modify onset and offset positions within a signal data signature recording 101 and attributes of the signal data signature recordings 101. In some embodiments, the RL-agent 300 may be initialized with a minimum distance window which defines the minimal distance between the onset and offset timings. The RL-agent 300 may also be initialized with a maximum distance window between the onset and offset timings, which may be used as an upper limit to constrain the search space. In some embodiments, the RL-agent 300 may be initialized with a starting index for the onset and offset tags within the signal data signature recording 101.

In some embodiments, the RL-agent 300 may be initialized with a set of hyperparameters, which may include epsilon $\varepsilon$ ($\varepsilon=1$), epsilon decay, $\varepsilon\_decay$ ($\varepsilon\_decay=0.999$), gamma, $\gamma$ ($\gamma=0.99$), and a loss rate $\eta$ ($\eta=0.001$). The hyperparameter epsilon $\varepsilon$ is used to encourage the RL-agent 300 to explore random actions. In some embodiments, the hyperparameter epsilon $\varepsilon$, specifies an $\varepsilon$-greedy policy whereby both greedy actions with an estimated greatest action value and non-greedy actions with an unknown action value are sampled. When a selected random number, r is less than epsilon $\varepsilon$, a random action a is selected. After each episode epsilon $\varepsilon$ is decayed by a factor $\varepsilon\_decay$. As the time progresses epsilon $\varepsilon$, becomes less and as a result fewer nongreedy actions are sampled.

In some embodiments, the hyperparameter gamma, $\gamma$ is the discount factor per future reward. In some embodiments, the objective of an RL-agent 300 is to find and exploit (control) an optimal action-value function that provides the greatest return of total reward. The standard assumption is that future rewards should be discounted by a factor $\gamma$ per time step.

In some embodiments, the loss rate, $\eta$ may be used to reduce the learning rate over time for the stochastic gradient descent optimizer. In some embodiments, the stochastic gradient descent optimizer is used to train the convolutional neural network through back propagation. The benefits of the loss rate may include increasing performance and reducing training time. In some embodiments, by using a loss rate, large changes may be made at the beginning of the training procedure when larger learning rate values are used and decreasing the learning rate such that a smaller rate and smaller training updates are made to weights later in the training procedure.

In some embodiments, the model may be used as a function approximator 202 to estimate the action-value function, q-value. In some embodiments, a convolutional neural network may be employed, however, any other model maybe substituted with the convolutional neural network (CNN), (e.g. generative adversarial network (GAN), logistic regression model, etc.).

In some embodiments, the function approximator 202 may include non-linear function approximators, such as neural networks with weight $\theta$ make up a Q-network which can be trained by minimizing a sequence of loss functions, $L_i(\theta_i)$ that change at each iteration i, $$L_i(\theta_i)=E_{s,\alpha\cdot\rho(\cdot)}[(y_i-Q(s,\alpha;\theta)^2)]$$

where $$y_i=E_{s,\alpha\sim\rho(\cdot);\acute{s}\sim\xi}[(r+\gamma\max_{\acute{\alpha}}Q(\acute{s}\acute{\alpha};\Theta_{i-1})|s,\alpha)]$$

is the target for iteration i and $\rho$ s, $\alpha$ is a probability distribution over states s or in this embodiment signal data signature recording with onset and offset indices s. and actions a such that it represents a signal data signature recording-action distribution. The parameters from the previous iteration $\theta_t$ are held fixed when optimizing the loss function, $L_t\theta_t$. Unlike the fixed targets used in supervised learning, the targets of a neural network depend on the network weights.

In some embodiments, taking the derivative of the loss function with respect to the weights yields, $$\nabla_{\Theta_i}L_i(\Theta_i)=E_{s,\alpha\cdot\rho(\cdot);\acute{s}\sim\xi}[(r+\gamma\max_{\acute{\alpha}}Q(\acute{s}\acute{\alpha};\Theta_{i-1})-Q(s,\alpha;\Theta_i))\nabla_{\Theta_i}Q(s,\alpha;\Theta_i)]$$

In some embodiments, it may be computationally prohibitive to compute the full expectation in the above gradient. Therefore, in some embodiments, the loss function is optimized by stochastic gradient descent. The Q-learning algorithm is implemented with the weights being updated after an episode, and the expectations are replaced by single samples from the signal data signature recording action distribution, ($\rho$ s, $\alpha$) and the emulator $\xi$.

In some embodiments, the function approximator 202 may be model-free which means that is does not construct an estimate of the emulator $\xi$ but rather solves the reinforcement-learning task directly using samples from the emulator $\xi$. In some embodiments, the function approximator 202 may also be off-policy meaning that the function approximator 202 algorithm follows $\varepsilon$-greedy policy which ensures adequate exploration of the state space while learning about the greedy policy $\alpha=\max_t Q(s, \alpha;\theta)$. Another embodiment would include on-policy learning.

In some embodiments, a NN of the function approximator 202 may be configured with a convolutional layer equal to the product of the number of features per signal data signature recording and a filter of 2, and a kernel size of 2. The filters specify the dimensionality of the output space. The kernel size specifies the length of the 1D convolutional window. In some embodiments, one-dimensional max pooling with a pool size of 2 may be used for the max-pooling layer of the CNN. In some embodiments, the CNN may employ a piecewise Huber loss function and adaptive learning rate optimizer, RMSprop with the loss rate, $\eta$ hyperparameter.

In some embodiments, after the model is initialized as an attribute of the RL-agent 300, a set of actions are defined that could be taken for the boundaries of the signal data signature recording within a minimum distance window. In some embodiments, the function approximator 202 is off-policy such that it randomly selects an action when the random number, $r[0,1]$ is less than hyperparameter epsilon $\varepsilon$. It selects the optimal policy and returns the argmax of the q-value when the random number, $r [0,1]$ is greater than the hyperparameter epsilon $\varepsilon$. After each episode epsilon $\varepsilon$ is decayed by a factor $\varepsilon\_decay$, a module is defined to decay epsilon $\varepsilon$. Finally, a module is defined to take a signal data signature features and fit a model to the signal data signature feature using a target value.

In some embodiments, the function approximator 202 may include signal data signature features such as a filter bank system. The filter bank system may include an analysis stage and synthesis stage. In some embodiments, the analysis stage may include a filter bank decomposition whereby the signal is filtered into sub-bands along with a sampling rate decimation. In some embodiments, the in a second stage, the decimated sub-band signals may be interpolated to reconstruct the original signal.

In some embodiments, approaches to generate signal data signature features include constant-Q filter banks, Fast Fourier Transform (FFT), multiresolution spectrogram, nonuniform filter banks, wavelet filter banks, dyadic filter banks and cosine-modulated filter-bank, among others or any combination thereof. In some embodiments, the constant Q filter bank may include smoothing the output of a Fast Fourier Transform, whereas a multiresolution spectrogram combines FFTs at different lengths and advances the FFTs forward through time. The Goetzel algorithm may be used to construct nonuniform filter banks.

In some embodiments, the reinforcement learning system 212 may include an RL-environment 115 with a current state, which is the index of onset and offset timings within the signal data signature recording that may or may not have been modified by the RL-agent 300. The RL-environment 115 may also ingest the match score for the current signal data signature recording and a reset state that restores the signal data signature recording to its original version before the RL-agent 300 performed actions. In some embodiments, the RL-environment 115 is initialized with a minimum and maximum distance window.

In some embodiments, the RL-environment 115 of the reinforcement learning system 212 may include a reward module that returns a negative reward r– if the modified signal data signature recording length has a net loss from the previous state's match score; it returns a positive reward r+ the match score is a net gain from the previous state's match score. An additional positive reward r+ is returned to the RL-agent 300 if the modified signal data signature recording 200 is a perfect match with the target distribution.

In some embodiments, during operation, the modified signal data signature recording 200 may be provided as input to a reinforcement-learning algorithm discriminator 301. In some embodiments, the discriminator 301 may produce a match-score in real-time from the signal data signature recording. The modified signal data signature recording 200 and match score represents RL-environment 115. In some embodiments, the RL-agent 300 may interact with the signal data signature recording 101 and receive the reward. In some embodiments, at operation the RL-agent 300 is incentivized to perform actions to the signal data signature recording 101 that will match the strong-labeled target distribution. In some embodiments the signal data signature and modified signal data signature are processed by the approximator 202. In some embodiments, this sequence of reinforcement learning, discrimination and signal data signature comparisons represents a deep machine learning process.

In some embodiments, a min size, batch size, number of episodes, and number of operations are initialized in the algorithm. The sequence of reinforcement learning, discrimination and signal data signature comparisons representing a deep machine learning process then may iterate over each episode from the total number of episodes, where; for each episode e, a signal data signature recording s in a sequential SDS library, is reset from the RL-environment 115 reset module to the original signal data signature recording 101 that was the input to the algorithm. The algorithm then iterates over k total number of operations; for each operation the signal data signature recording s is passed to the RL-agent 300 module act.

In some embodiments, the NN and/or LR model of the function approximator 202 is trained with weights $\theta$ to minimize the sequence of loss functions, $L_i\theta_i$ either using the target as the reward or the target as the q-value derived from Bellman equation. In some embodiments, a greedy action a, is selected when the random number r is greater than epsilon e. In some embodiments, the filter bank s_vec is returned for the signal data signature recording 101 and the function approximator 202 then predicts X using the filter bank s_vec and sets the q-value to X. In some embodiments, the RL-agent 300 may then select an action as the argmax of the q-value and action a returned.

In some embodiments, the benefits of a software 109 of a reinforcement learning system in contrast to supervised learning are that it does not require large, paired training datasets (e.g. on the order of $10^9$ to $10^{10}$). Reinforcement learning is a type of on-policy machine learning that balances between exploration and exploitation. Exploration is testing new things that have not been tried before to see if this leads to an improvement in the total reward. Exploitation is trying things that have worked best in the past. Supervised learning approaches are purely exploitative and only learn from retrospective paired datasets.

Supervised learning is retrospective machine learning that occurs after a collective set of known outcomes is determined. The collective set of known outcomes is referred to as paired training dataset such that a set of features is mapped to a known label. The cost of acquiring paired training datasets is substantial. For example, IBM's Canadian Hansaard corpus with a size of $10^9$ cost an estimated $100 million dollars.

In addition, supervised learning approaches are often brittle such that the performance degrades with datasets that were not present in the training data. The only solution is often reacquisition of paired datasets which can be as costly as acquiring the original paired datasets.

Real-Time Chain Oracle, Nn Model

One or more aspects includes a real-time chain oracle, the chain oracle 302, e.g., the chain oracle system 112, which is trained as a chain made up of a first stage including the NN model(s) 301A and a second stage including the LR model 301B. In some embodiments, the NN model(s) 301A may be implemented as a chain of NN models, or as parallel and/or independent NN model(s). In some embodiments, the NN model(s) 301A may include, e.g., a recurrent network, a convolutional network, a generative adversarial network, or any other suitable neural network. The chain oracle 302, e.g., the chain oracle system 112, may include a sequential SDS library and the chain of the NN model(s) 301A and the LR model 301B. Concurrently, the chain of the NN model(s) 301A and the LR model 301B may be trained to distinguish between its sequential signal data signature recordings, which is used to produce gradient feedback to improve the chain oracle 302. For each sequential signal data signature recording in the sequential SDS library, the chain of the NN model(s) 301A and the LR model 301B may produce a prediction for a probability of a match to a target distribution (e.g., a match score). In some embodiments, the predicted probability or match score may be compared to a known probability or match score for a corresponding sequential signal data signature recording, and an error may be determined according to a suitable loss function.

In some embodiments, the chain oracle 302 may include an NN ensemble with an LR model trained on recordings belonging to a particular signal data signature event such as a cough due to a particular disease or condition (e.g., COVID-19, pneumonia, bronchitis, etc.), a mechanical fault or deterioration in mechanical equipment, or other signal characteristic of a particular source and/or condition of a source. In some embodiments, based on the error of the final prediction, the chain of the NN model(s) 301A and the LR model 301B may each be trained according to, e.g., back-propagation such as a gradient descent method to update the parameters of each model of the chain oracle 302.

Figure 4:
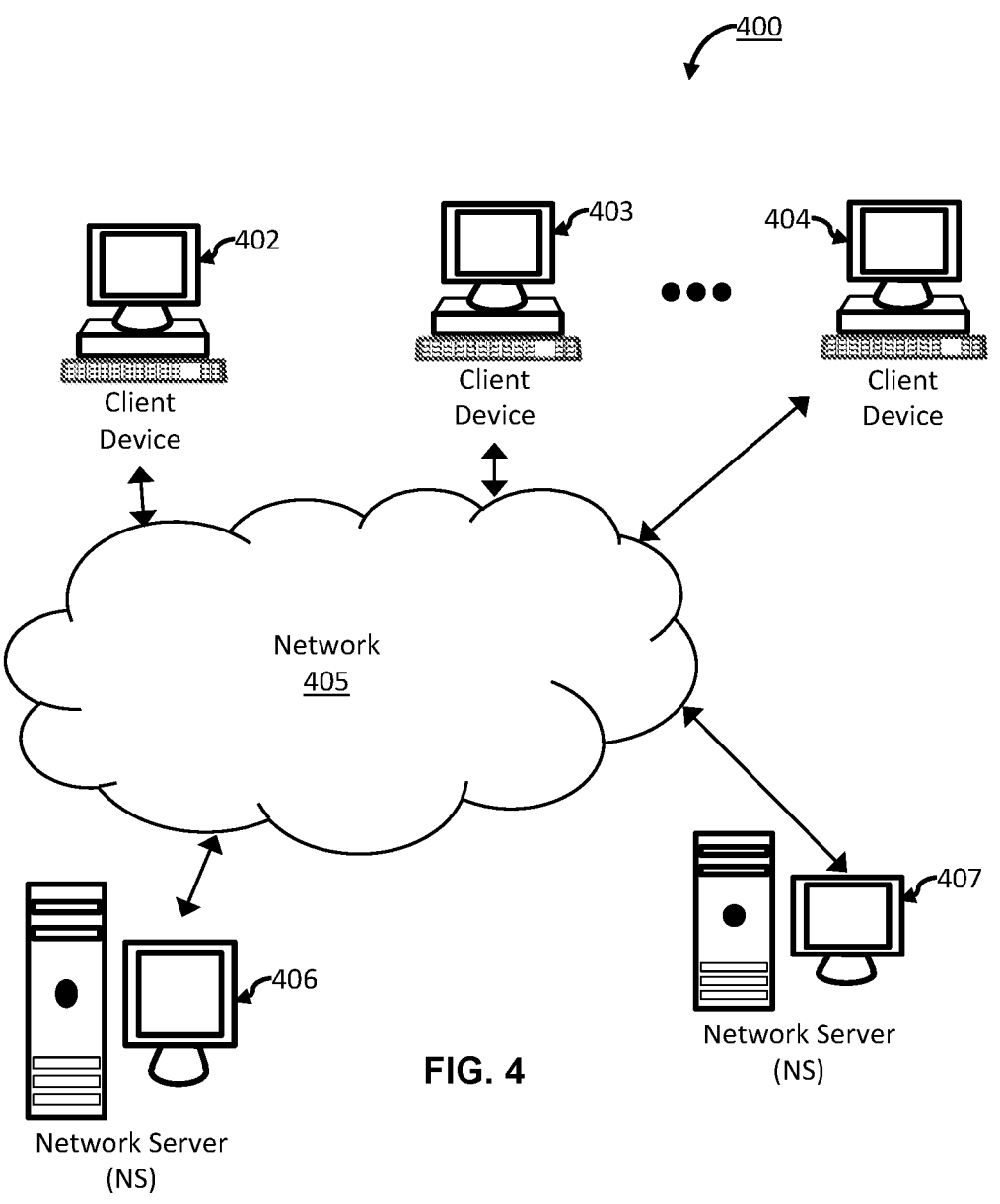
FIG. 4 depicts a block diagram of an exemplary computer-based system and platform 500 for a signal data signature detection system 100 according to aspects of embodiments of the present disclosure.

FIG. 4 depicts a block diagram of an exemplary computer-based system and platform 400 for a signal data signature detection system 100 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 4, member computing device 402, member computing device 403 through member computing device 404 (e.g., member computing devices) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Apache on Linux or Microsoft IIS (Internet Information Services). In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 5:
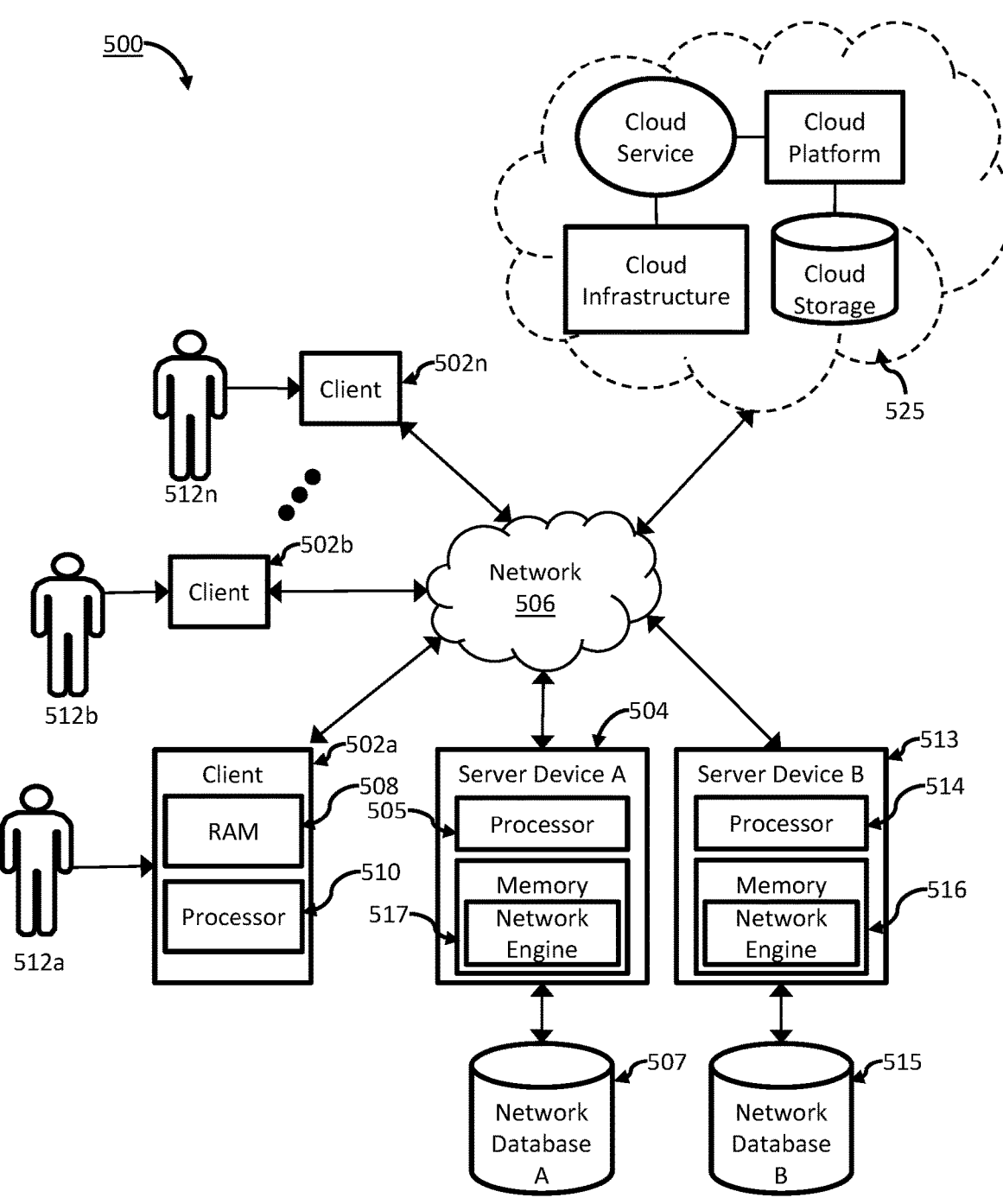
FIG. 5 depicts a block diagram of another exemplary computer-based system and platform 500 for a signal data signature detection system 100 according to aspects of embodiments of the present disclosure.

FIG. 5 depicts a block diagram of another exemplary computer-based system and platform 500 for a signal data signature detection system 100 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 502a, member computing device 502b through member computing device 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of member computing device 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, or other input or output devices. In some embodiments, examples of member computing devices 502a through 502n (e.g., member computing devices) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™, Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing devices 502*a* through 502*n*, user 512*a*, user 512*b* through user 512*n*, may communicate over the exemplary network 506 with each other and/or with other systems and/or devices coupled to the network 506. As shown in FIG. 5, exemplary server devices 504 and 513 may include processor 505 and processor 514, respectively, as well as memory 517 and memory 516, respectively. In some embodiments, the server devices 504 and 513 may be also coupled to the network 506. In some embodiments, one or more member computing devices 502*a* through 502*n* may be mobile member computing devices.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Chain oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
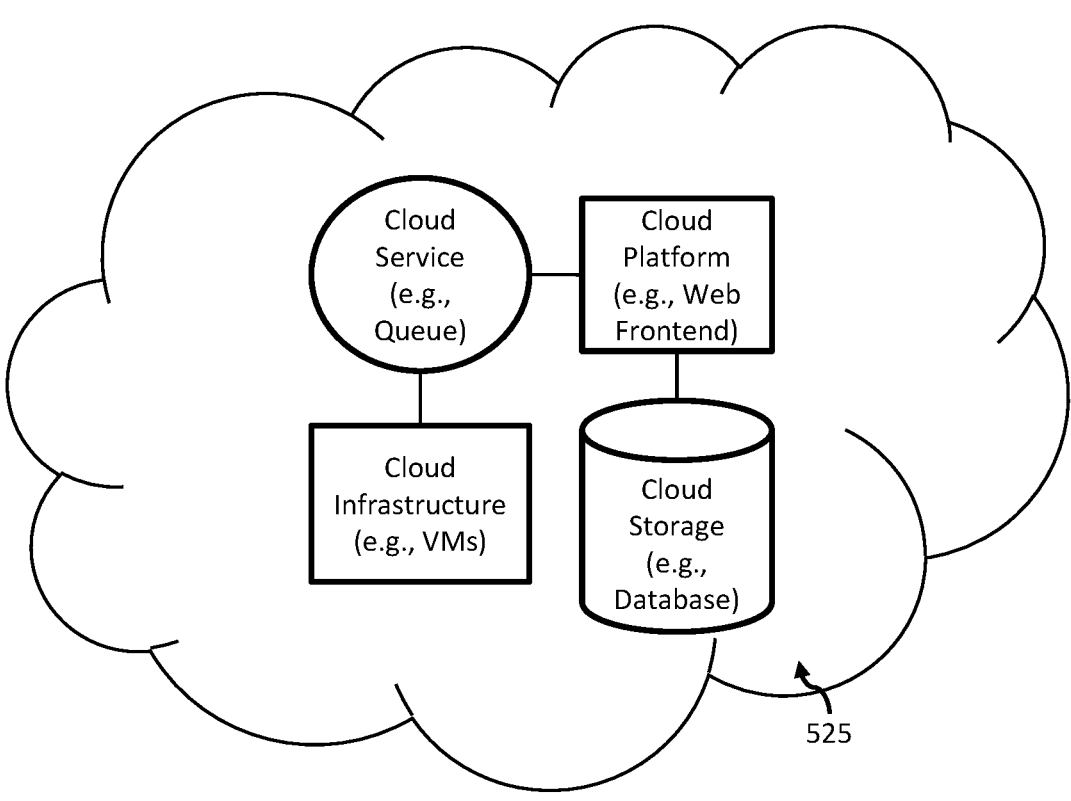
FIG. 6 depicts schematics of an exemplary implementation of the cloud computing/architecture(s) in which the exemplary inventive computer-based systems/platforms for a signal data signature detection system 100 of the present disclosure may be specifically configured to operate according to aspects of embodiments of the present disclosure.
Figure 7:
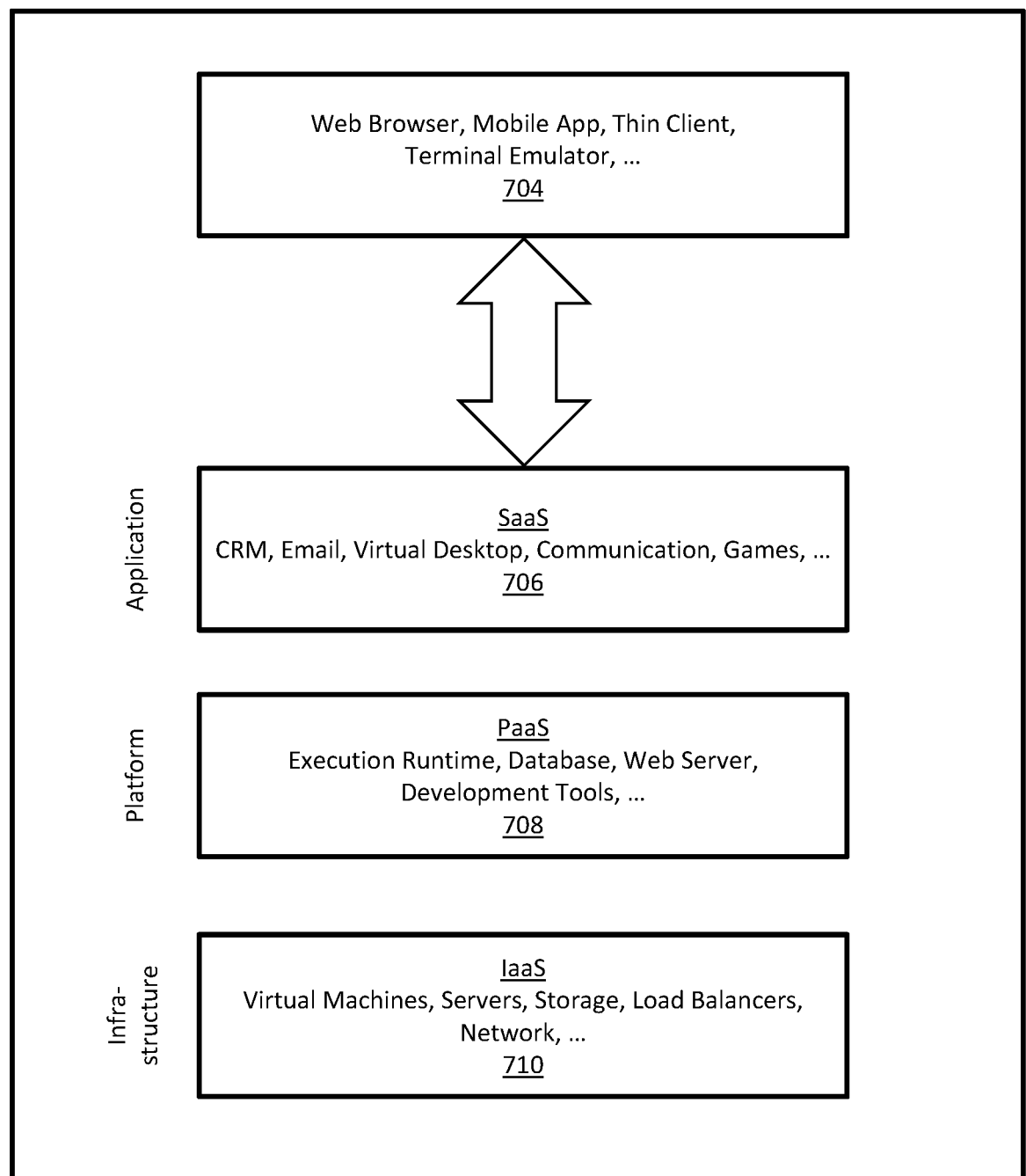
FIG. 7 depicts schematics of an exemplary implementation of the cloud computing/architecture(s) in which the exemplary inventive computer-based systems/platforms for a signal data signature detection system 100 of the present disclosure may be specifically configured to operate according to aspects of embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/ architecture 525 such as, but not limiting to: infrastructure a service (IaaS) 710, platform as a service (PaaS) 708, and/or software as a service (SaaS) 706 using a web browser, mobile app, thin member computing device, terminal emulator or other endpoint 704. FIGS. 6 and 7 illustrate schematics of exemplary implementations of the cloud computing/architecture(s) in which the exemplary inventive computer-based systems/platforms for a signal data signature detection system 100 of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Chain oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a member computing device-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9, 999), at least 10,000 (e.g., but not limited to, 10,000-99, 999), at least 100,000 (e.g., but not limited to, 100,000-999, 999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000, 000 (e.g., but not limited to, 1,000,000,000-999,999,999, 999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1. A method comprising:

receiving, by a processor, a first training data set comprising:

first input data and first output data associated with the first input data;

training, by the processor, a plurality of neural network models using the first training data set;

receiving, by the processor, a second training data set comprising:

second input data and second output data associated with the second input data;

training, by the processor, a logistic regression (LR) model using the second training data set;

determining, by the processor, a range of a number of neural network models to employ;

testing, by the processor, candidate chain oracle models by iteratively performing, for each particular number of neural network models in the range of the number of neural network models, a predetermined number of trials, wherein each trail of the predetermined number of trials for each particular number of neural networks comprises:

randomly selecting the particular number of neural network models from the plurality of neural network models;

utilizing each neural network model of the particular number of neural network models to generate a respective predictive output based on the second input data;

utilizing the LR model to generate a trial output based on the respective predictive output, and determining a model trial performance based on:

the trial output, the second output data, and at least one machine learning performance metric;

determining, by the processor, a chain oracle model from the candidate chain oracle models based at least in part on the at least one machine learning performance metric associated with each particular number of neural network models in the range of the number of neural network models; and deploying, by the processor, the chain oracle model.

Clause 2. The method of clause 1, wherein the at least one machine learning performance metric comprises at least one of:

Confusion matrix,
Accuracy,
Sensitivity,
Specificity,
F1 score,
Area Under ROC curve (AUC),
Logarithmic Loss (LOGLOSS),
Mean Absolute Error (MAE),
Mean Square Error (MSE),
R Squared (R2).

Clause 3. A signal data signature detection system for performing edits on the signal data signature recording and produces the modified signal data signature recording that matches with a target signal data signature recording distribution, the signal data signature detection system comprising:

a signal data signature recording;
a physical hardware device comprising a memory unit and processor;
software instructions comprising at least one computer program;
a display media;
wherein the memory unit is configured to store the signal data signature recording created by the physical interface on a temporary basis;
wherein the memory unit is configured to store the data sources created by the physical interface on a temporary basis;
wherein the memory unit is configured to store the at least one computer program on a temporary basis;
wherein the processor is configured to execute the software instructions of the at least one computer program in the memory unit, wherein the software instructions, upon execution, cause the processor to perform steps to:
provide the reinforcement learning system and the signal data signature recording and a minimum distance window which constrains the agent to only perform actions within the minimum distance window;
provide the reinforcement learning agent with a reward function wherein the reward function uses an chain oracle NN model and returns a positive reward if the signal data signature recording is a match with the target distribution;
provide the reinforcement learning agent with a reward function wherein the reward function uses an chain oracle NN model and returns a positive reward if there is a net gain in concordance between a modified signal data signature recording and the target distribution when compared with the previous signal data signature recording state;
provide the reinforcement learning agent with a reward function wherein the reward function uses an chain oracle NN model and returns a negative reward if there is a net loss in concordance between a modified signal data signature recording and the target distribution when compared with the previous signal data signature recording state;
provide the reinforcement learning agent with a pool of states, actions, and rewards and a function approximator wherein using the function approximator the reinforcement learning agent predicts the best action to take resulting in maximum reward;

wherein the reinforcement learning agent optimizes a policy such the agent learns modifications to make to an onset timing and an offset timing within the minimum distance window to match the signal data signature recording with the target distribution; and
output to the display media:
an output labeled signal data signature recording that is labeled with the onset timing and the offset timing and
an output type of the output labeled signal data signature recording.

Clause 4. A system comprising:

at least one processor configured to execute software instruction, wherein the software instructions, upon execution, cause the at least one processor to perform steps to:
receive a first state comprising:
i) a signal data signature recording;
wherein the signal data signature recording comprises a signal data signature associated with a source of the signal data signature recording,
ii) a first onset location within the signal data signature recording,
wherein the first onset location comprises a beginning of the signal data signature within the signal data signature recording,
iii) a first offset location within the signal data signature recording,
wherein the first offset location comprises an end of the signal data signature within the signal data signature recording;
receive a first reward associated with the first state;
determine an action to produce a second state based on the first state, the first reward and a policy of a reinforcement learning agent, wherein the second state comprises:
i) the signal data signature recording;
ii) a second onset location within the signal data signature recording,
wherein the second onset location comprises a modified beginning of the signal data signature within the signal data signature recording,
iii) a second offset location within the signal data signature recording,
wherein the second offset location comprises a modified end of the signal data signature within the signal data signature recording;
utilize a recurrent neural network to determine a match score representative of a similarity between the second state and a target distribution of a signal data signature type based at least in part on the second state and model parameters trained against the target distribution;
determine a second reward based on the match score;
determine, based on the second reward exceeding a maximum reward threshold, a modified signal data signature recording comprising the signal data signature having the modified beginning and the modified end; and
instruct a user device to display the modified signal data signature recording and the signal data signature type to a user to indicate a matching signal data signature type.

Clause 5. A method comprising:

receiving, by at least one processor, a first state comprising:
i) a signal data signature recording;
wherein the signal data signature recording comprises a signal data signature associated with a source of the signal data signature recording, ii) a first onset location within the signal data signature recording, wherein the first onset location comprises a beginning of the signal data signature within the signal data signature recording, iii) a first offset location within the signal data signature recording, wherein the first offset location comprises an end of the signal data signature within the signal data signature recording;

receiving, by at least one processor, a first reward associated with the first state;

determining, by at least one processor, an action to produce a second state based on the first state, the first reward and a policy of a reinforcement learning agent, wherein the second state comprises:

i) the signal data signature recording;

ii) a second onset location within the signal data signature recording, wherein the second onset location comprises a modified beginning of the signal data signature within the signal data signature recording, iii) a second offset location within the signal data signature recording, wherein the second offset location comprises a modified end of the signal data signature within the signal data signature recording;

utilizing, by at least one processor, a recurrent neural network to determine a match score representative of a similarity between the second state and a target distribution of a signal data signature type based at least in part on the second state and model parameters trained against the target distribution;

determining, by at least one processor, a second reward based on the match score;

determining, based on the second reward exceeding a maximum reward threshold, by at least one processor, a modified signal data signature recording comprising the signal data signature having the modified beginning and the modified end; and instructing, by at least one processor, a user device to display the modified signal data signature recording and the signal data signature type to a user to indicate a matching signal data signature type.

Clause 6. A non-transitory computer readable medium having software instructions stored thereon, the software instructions configured to cause at least one processor to perform steps comprising:

receive a first state comprising:

i) a signal data signature recording;

wherein the signal data signature recording comprises a signal data signature associated with a source of the signal data signature recording, ii) a first onset location within the signal data signature recording, wherein the first onset location comprises a beginning of the signal data signature within the signal data signature recording, iii) a first offset location within the signal data signature recording, wherein the first offset location comprises an end of the signal data signature within the signal data signature recording;

receive a first reward associated with the first state;

determine an action to produce a second state based on the first state, the first reward and a policy of a reinforcement learning agent, wherein the second state comprises:

i) the signal data signature recording;

ii) a second onset location within the signal data signature recording, wherein the second onset location comprises a modified beginning of the signal data signature within the signal data signature recording, iii) a second offset location within the signal data signature recording, wherein the second offset location comprises a modified end of the signal data signature within the signal data signature recording;

utilize a recurrent neural network to determine a match score representative of a similarity between the second state and a target distribution of a signal data signature type based at least in part on the second state and model parameters trained against the target distribution;

determine a second reward based on the match score;

determine, based on the second reward exceeding a maximum reward threshold, a modified signal data signature recording comprising the signal data signature having the modified beginning and the modified end; and instruct a user device to display the modified signal data signature recording and the signal data signature type to a user to indicate a matching signal data signature type.

Clause 7. The systems, methods and/or non-transitory computer readable media as recited in clauses 1 through 6, wherein the at least one processor is further configured to execute software instructions that, upon execution, cause the at least one processor to perform steps to:

train the recurrent neural network, wherein training the recurrent neural network comprises:

receiving, by a sequential SDS machine learning model, the target distribution;

generating, by the sequential SDS machine learning model, a plurality of simulated distributions based on the target distribution;

receiving, by the recurrent neural network, a plurality of distributions comprising the target distribution and the plurality of simulated machine distributions;

determining, by the recurrent neural network, a respective match score for each respective distribution of the plurality of distributions;

determining, by the recurrent neural network, at least one matching distribution of the plurality of distributions based on the respective match score for each respective distribution of the plurality of distributions; and training the recurrent neural network based on a difference between the at least one matching distribution and the target distribution.

Clause 8. The systems, methods and/or non-transitory computer readable media as recited in clauses 1 through 6, wherein the at least one processor is further configured to execute software instructions that, upon execution, cause the at least one processor to perform steps to:

determine a net change in concordance between the second state and the target distribution based on the match score;

wherein the net change comprises at least one of:

a net gain in concordance, and a net loss in concordance; and determine the reward based on the net change. Clause 9. The systems, methods and/or non-transitory computer readable media as recited in clauses 1 through 6, wherein the at least one processor is further configured to execute software instructions that, upon execution, cause the at least one processor to perform steps to:

determine a difference between the first onset location and the first offset location in the signal data signature recording; and determine the action as a modification to at least one of the first onset location and the second onset location that maintains the difference within a maximum window.

Clause 10. The systems, methods and/or non-transitory computer readable media as recited in clauses 1 through 6, wherein the at least one processor is further configured to execute software instructions that, upon execution, cause the at least one processor to perform steps to:

determine a difference between the first onset location and the first offset location in the signal data signature recording; and determine the action as a modification to at least one of the first onset location and the second onset location that maintains the difference to be greater than a minimum window.

Clause 11. The systems, methods and/or non-transitory computer readable media as recited in clauses 1 through 6, wherein the at least one processor is further configured to execute software instructions that, upon execution, cause the at least one processor to perform steps to:

utilize a function approximator machine learning model to produce an updated policy based on the first state, the action, the second state and the second reward;

wherein the updated policy comprises at least one modified parameter of the policy.

Clause 12. The systems, methods and/or non-transitory computer readable media as recited in clauses 1 through 6, wherein the function approximator machine learning comprises a deep learning neural network.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A method comprising:

receiving, by at least one processor, a first training data set comprising:

first input data and first output data associated with the first input data;

training, by the at least one processor, a plurality of neural network models using the first training data set;

receiving, by the at least one processor, a second training data set comprising:

second input data and second output data associated with the second input data;

training, by the at least one processor, a logistic regression (LR) model using the second training data set;

determining, by the at least one processor, a range of a number of neural network models to employ;

testing, by the at least one processor, candidate chain oracle models by iteratively performing, for each particular number of neural network models in the range of the number of neural network models, a predetermined number of trials, wherein each trail of the predetermined number of trials for each particular number of neural networks comprises:

randomly selecting the particular number of neural network models from the plurality of neural network models;

utilizing each neural network model of the particular number of neural network models to generate a respective predictive output based on the second input data;

utilizing the LR model to generate a trial output based on the respective predictive output, and determining a model trial performance based on:

the trial output, the second output data, and at least one machine learning performance metric;

determining, by the at least one processor, a chain oracle model from the candidate chain oracle models based at least in part on the at least one machine learning performance metric associated with each particular number of neural network models in the range of the number of neural network models; and deploying, by the at least one processor, the chain oracle model.

2. The method of claim 1, wherein the at least one machine learning performance metric comprises at least one of:

Confusion matrix,

Accuracy,

Sensitivity,

Specificity,

F1 score,

Area Under ROC curve (AUC),

Logarithmic Loss (LOGLOSS),

Mean Absolute Error (MAE),

Mean Square Error (MSE),

R Squared (R2).

3. The method of claim 1, further comprising:

receiving, by the at least one processor, a first state comprising:

i) a signal data signature recording;

wherein the signal data signature recording comprises a signal data signature associated with a source of the signal data signature recording, ii) a first onset location within the signal data signature recording, wherein the first onset location comprises a beginning of the signal data signature within the signal data signature recording, iii) a first offset location within the signal data signature recording, wherein the first offset location comprises an end of the signal data signature within the signal data signature recording;

receiving, by the at least one processor, a first reward associated with the first state;

determining, by the at least one processor, an action to produce a second state based on the first state, the first reward and a policy of a reinforcement learning agent, wherein the second state comprises:

i) the signal data signature recording;

ii) a second onset location within the signal data signature recording, wherein the second onset location comprises a modified beginning of the signal data signature within the signal data signature recording, iii) a second offset location within the signal data signature recording, wherein the second offset location comprises a modified end of the signal data signature within the signal data signature recording;

utilizing, by the at least one processor, the chain oracle model to determine a match score representative of a similarity between the second state and a target distribution of a signal data signature type based at least in part on the second state, each particular number of neural network and the LR model;

determining, by the at least one processor, a second reward based on the match score;

determining, based on the second reward exceeding a maximum reward threshold, by the at least one processor, a modified signal data signature recording comprising the signal data signature having the modified beginning and the modified end; and instructing, by the at least one processor, a user device to display the modified signal data signature recording and the signal data signature type to a user to indicate a matching signal data signature type.

4. The method of claim 3, further comprising:

executing, by the at least one processor, software instructions that, upon execution, cause the at least one processor to perform steps to:

determine a net change in concordance between the second state and the target distribution based on the match score;

wherein the net change comprises at least one of:

a net gain in concordance, and a net loss in concordance; and determine the reward based on the net change.

5. The method of claim 3, further comprising:

executing, by the at least one processor, software instructions that, upon execution, cause the at least one processor to perform steps to:

determine a difference between the first onset location and the first offset location in the signal data signature recording; and determine the action as a modification to at least one of the first onset location and the second onset location that maintains the difference within a maximum window.

6. The method of claim 3, further comprising executing, by the at least one processor, software instructions that, upon execution, cause the at least one processor to perform steps to:

determine a difference between the first onset location and the first offset location in the signal data signature recording; and determine the action as a modification to at least one of the first onset location and the second onset location that maintains the difference to be greater than a minimum window.

7. The method of claim 3, further comprising:

executing, by the at least one processor, software instructions that, upon execution, cause the at least one processor to perform steps to:

utilize a function approximator machine learning model to produce an updated policy based on the first state, the action, the second state and the second reward;

wherein the updated policy comprises at least one modified parameter of the policy.

8. A non-transitory computer readable medium having software instructions stored thereon, the software instructions configured to cause at least one processor to perform steps comprising:

receive a first training data set comprising:

first input data and first output data associated with the first input data;

train a plurality of neural network models using the first training data set;

receive a second training data set comprising:

second input data and second output data associated with the second input data;

train a logistic regression (LR) model using the second training data set;

determine a range of a number of neural network models to employ;

teste candidate chain oracle models by iteratively performing, for each particular number of neural network models in the range of the number of neural network models, a predetermined number of trials, wherein each trail of the predetermined number of trials for each particular number of neural networks comprises:

randomly selecting the particular number of neural network models from the plurality of neural network models;

utilizing each neural network model of the particular number of neural network models to generate a respective predictive output based on the second input data;

utilizing the LR model to generate a trial output based on the respective predictive output, and determining a model trial performance based on:

the trial output, the second output data, and at least one machine learning performance metric;

determine a chain oracle model from the candidate chain oracle models based at least in part on the at least one machine learning performance metric associated with each particular number of neural network models in the range of the number of neural network models; and deploy the chain oracle model.

9. The non-transitory computer readable medium of claim 8, wherein the at least one machine learning performance metric comprises at least one of:

Confusion matrix,

Accuracy,

Sensitivity,

Specificity,

F1 score,

Area Under ROC curve (AUC),

Logarithmic Loss (LOGLOSS),

Mean Absolute Error (MAE),

Mean Square Error (MSE),

R Squared (R2).

10. The non-transitory computer readable medium of claim 8, wherein the at least one processor is further configured to execute software instructions that, upon execution, cause the at least one processor to perform steps to:

receive a first state comprising:

i) a signal data signature recording;

wherein the signal data signature recording comprises a signal data signature associated with a source of the signal data signature recording, ii) a first onset location within the signal data signature recording, wherein the first onset location comprises a beginning of the signal data signature within the signal data signature recording, iii) a first offset location within the signal data signature recording, wherein the first offset location comprises an end of the signal data signature within the signal data signature recording;

receive a first reward associated with the first state;

determine an action to produce a second state based on the first state, the first reward and a policy of a reinforcement learning agent, wherein the second state comprises:

i) the signal data signature recording;

ii) a second onset location within the signal data signature recording, wherein the second onset location comprises a modified beginning of the signal data signature within the signal data signature recording, iii) a second offset location within the signal data signature recording, wherein the second offset location comprises a modified end of the signal data signature within the signal data signature recording;

utilize the chain oracle model to determine a match score representative of a similarity between the second state and a target distribution of a signal data signature type based at least in part on the second state, each particular number of neural network and the LR model;

determine a second reward based on the match score;

determining, based on the second reward exceeding a maximum reward threshold, by at least one processor, a modified signal data signature recording comprising the signal data signature having the modified beginning and the modified end; and instruct a user device to display the modified signal data signature recording and the signal data signature type to a user to indicate a matching signal data signature type.

11. The non-transitory computer readable medium of claim 10, wherein the at least one processor is further configured to execute software instructions that, upon execution, cause the at least one processor to perform steps to:

determine a net change in concordance between the second state and the target distribution based on the match score;

wherein the net change comprises at least one of:

a net gain in concordance, and a net loss in concordance; and determine the reward based on the net change.

12. The non-transitory computer readable medium of claim 10, wherein the at least one processor is further configured to execute software instructions that, upon execution, cause the at least one processor to perform steps to:

determine a difference between the first onset location and the first offset location in the signal data signature recording; and determine the action as a modification to at least one of the first onset location and the second onset location that maintains the difference within a maximum window.

13. The non-transitory computer readable medium of claim 10, wherein the at least one processor is further configured to execute software instructions that, upon execution, cause the at least one processor to perform steps to:

determine a difference between the first onset location and the first offset location in the signal data signature recording; and determine the action as a modification to at least one of the first onset location and the second onset location that maintains the difference to be greater than a minimum window.

14. The non-transitory computer readable medium of claim 10, wherein the at least one processor is further configured to execute software instructions that, upon execution, cause the at least one processor to perform steps to:

utilize a function approximator machine learning model to produce an updated policy based on the first state, the action, the second state and the second reward;

wherein the updated policy comprises at least one modified parameter of the policy.

15. A system comprising:

at least one processor in communication with at least one system having software instructions stored thereon, wherein the at least one processor, upon execution of the software instructions, is configured to:

receive a first training data set comprising:

first input data and first output data associated with the first input data;

train a plurality of neural network models using the first training data set;

receive a second training data set comprising:

second input data and second output data associated with the second input data;

train a logistic regression (LR) model using the second training data set;

determine a range of a number of neural network models to employ;

test candidate chain oracle models by iteratively performing, for each particular number of neural network models in the range of the number of neural network models, a predetermined number of trials, wherein each train of the predetermined number of trials for each particular number of neural networks comprises:

randomly selecting the particular number of neural network models from the plurality of neural network models;

utilizing each neural network model of the particular number of neural network models to generate a respective predictive output based on the second input data;

utilizing the LR model to generate a trial output based on the respective predictive output, and determining a model trial performance based on:

the trial output, the second output data, and at least one machine learning performance metric;

determine a chain oracle model from the candidate chain oracle models based at least in part on the at least one machine learning performance metric associated with each particular number of neural network models in the range of the number of neural network models; and deploy the chain oracle model.

16. The system of claim 15, wherein the at least one machine learning performance metric comprises at least one of:

Confusion matrix,

Accuracy,

Sensitivity,

Specificity,

F1 score,

Area Under ROC curve (AUC),

Logarithmic Loss (LOGLOSS),

Mean Absolute Error (MAE),

Mean Square Error (MSE),

R Squared (R2).

17. The system of claim 16, wherein the at least one processor, upon execution of the software instructions, is further configured to:

receive a first state comprising:

i) a signal data signature recording;

wherein the signal data signature recording comprises a signal data signature associated with a source of the signal data signature recording, ii) a first onset location within the signal data signature recording, wherein the first onset location comprises a beginning of the signal data signature within the signal data signature recording, iii) a first offset location within the signal data signature recording, wherein the first offset location comprises an end of the signal data signature within the signal data signature recording;

receive a first reward associated with the first state;

determine an action to produce a second state based on the first state, the first reward and a policy of a reinforcement learning agent, wherein the second state comprises:

i) the signal data signature recording;

ii) a second onset location within the signal data signature recording, wherein the second onset location comprises a modified beginning of the signal data signature within the signal data signature recording, iii) a second offset location within the signal data signature recording, wherein the second offset location comprises a modified end of the signal data signature within the signal data signature recording;

utilize the chain oracle model to determine a match score representative of a similarity between the second state and a target distribution of a signal data signature type based at least in part on the second state, each particular number of neural network and the LR model;

determine a second reward based on the match score;

determining, based on the second reward exceeding a maximum reward threshold, by at least one processor, a modified signal data signature recording comprising the signal data signature having the modified beginning and the modified end; and instruct a user device to display the modified signal data signature recording and the signal data signature type to a user to indicate a matching signal data signature type.

18. The system of claim 17, wherein the at least one processor, upon execution of the software instructions, is further configured to:

determine a net change in concordance between the second state and the target distribution based on the match score;

wherein the net change comprises at least one of:

a net gain in concordance, and a net loss in concordance; and determine the reward based on the net change.

19. The system of claim 17, wherein the at least one processor, upon execution of the software instructions, is further configured to:

determine a difference between the first onset location and the first offset location in the signal data signature recording; and determine the action as a modification to at least one of the first onset location and the second onset location that maintains the difference within a maximum window.

20. The system of claim 17, wherein the at least one processor, upon execution of the software instructions, is further configured to:

utilize a function approximator machine learning model to produce an updated policy based on the first state, the action, the second state and the second reward;

wherein the updated policy comprises at least one modified parameter of the policy.

* * * * *